US011198280B2

(12) United States Patent
Fukukawa et al.

(10) Patent No.: US 11,198,280 B2
(45) Date of Patent: Dec. 14, 2021

(54) MEDICAL FILM AND METHOD FOR PRODUCING SAME, MEDICAL COATING COMPOSITION, MEDICAL DEVICE AND METHOD FOR PRODUCING SAME

(71) Applicant: MITSUI CHEMICALS, INC., Tokyo (JP)

(72) Inventors: Kenichi Fukukawa, Tokyo (JP); Masaki Okazaki, Chiba (JP); Tatsuhiro Urakami, Ichihara (JP); Hiroshi Miyasako, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 319 days.

(21) Appl. No.: 16/319,611

(22) PCT Filed: Jul. 20, 2017

(86) PCT No.: PCT/JP2017/026208
§ 371 (c)(1),
(2) Date: Jan. 22, 2019

(87) PCT Pub. No.: WO2018/016561
PCT Pub. Date: Jan. 25, 2018

(65) Prior Publication Data
US 2020/0129377 A1    Apr. 30, 2020

(30) Foreign Application Priority Data
Jul. 22, 2016  (JP) .............................. JP2016-144842

(51) Int. Cl.
*B32B 27/28*      (2006.01)
*B32B 27/08*      (2006.01)

(52) U.S. Cl.
CPC ............ *B32B 27/281* (2013.01); *B32B 27/08* (2013.01); *B32B 2250/02* (2013.01); *B32B 2250/24* (2013.01); *B32B 2439/80* (2013.01)

(58) Field of Classification Search
CPC ... B32B 27/281; B32B 27/08; B32B 2439/80; B32B 2250/02; B32B 2250/24; B32B 7/02; B32B 27/18; B32B 2307/31; B32B 2262/101; B32B 2264/108; B32B 2307/546; B32B 2255/26; B32B 2264/10; B32B 2264/105; B32B 2250/03; B32B 2307/54; B32B 2307/554; B32B 2307/412; B32B 2255/10; B32B 2553/00; B32B 2264/101; B32B 2250/05; B32B 2307/732; B32B 2264/102; B32B 2307/714; B32B 2307/306; B32B 2439/06; B32B 2439/46; B32B 2535/00; B32B 2307/30; B32B 7/027; C08G 73/1071; C08G 73/1039; C08G 73/1046; C08G 73/1042; C08G 73/1082; C09D 179/08; C08J 2379/08; C08J 5/18; C08J 7/04; A61J 1/05; C08L 79/08; C08L 2203/02; C08L 2203/16
See application file for complete search history.

(56) References Cited

U.S. PATENT DOCUMENTS

| 5,049,156 | A | * | 9/1991 | Higashi | ................... | A61L 27/50 |
|---|---|---|---|---|---|---|
|   |   |   |   |   |   | 623/6.56 |
| 2006/0271135 | A1 |   | 11/2006 | Minar et al. |   |   |
| 2010/0059248 | A1 | * | 3/2010 | Honda | ................... | H01B 3/427 |
|   |   |   |   |   |   | 174/110 SR |
| 2011/0318588 | A1 |   | 12/2011 | Fukukawa et al. |   |   |
| 2012/0021234 | A1 |   | 1/2012 | Fukukawa et al. |   |   |
| 2016/0075830 | A1 |   | 3/2016 | Fukukawa et al. |   |   |
| 2016/0115276 | A1 |   | 4/2016 | Fukukawa et al. |   |   |

FOREIGN PATENT DOCUMENTS

| JP | 05170945 | A | 7/1993 |
|---|---|---|---|
| JP | 2004242725 | A | 9/2004 |
| JP | 2006326290 | A | 12/2006 |
| JP | 2008541864 | A | 11/2008 |
| JP | 2014195705 | A | 10/2014 |
| WO | 2010100874 | A1 | 9/2010 |
| WO | 2010113412 | A1 | 10/2010 |
| WO | 2014174838 | A1 | 10/2014 |
| WO | 2014185353 | A1 | 11/2014 |
| WO | 2015/080158 | A1 | 6/2015 |
| WO | 2015/0166848 | A1 | 11/2015 |
| WO | 2016013627 | A1 | 1/2016 |

OTHER PUBLICATIONS

Richardson et al., "Polymide as Biomaterials: Preliminary Biocompatibility Testing," Biomaterials, 1993, vol. 14, No. 8, pp. 627-635.
Sojiphan et al., "Materials Selection Analysis: Bag for Viable Blood Storage," Jan. 1, 2004. XP055661978, retrieved from https://www.researchgate.net/publication/291766516 on Jan. 27, 2020. (13 pages).
"Colour Cute i", Sep. 1, 2011, retrieved from https://www.sugatest.co.jp/en/wordpress/wp-content/uploads/2019/02/CC-i_20111001.pdf on Jan. 24, 2020. (2 pages).
Partial Supplemental European Search Report dated Feb. 19, 2020, by the European Patent Office in corresponding European Patent Application No. 17831077.7. (16 pages).
International Search Report (PCT/ISA/210) dated Sep. 26, 2017, by the Japanese Patent Office as the International Searching Authority for International Application No. PCT/JP2017/026208.
(Continued)

*Primary Examiner* — John D Freeman
(74) *Attorney, Agent, or Firm* — Buchanan Ingersoll & Rooney PC

(57) ABSTRACT

The purpose of the present invention is to provide a medical film having excellent transparency, heat resistance, and solvent resistance. This medical film is a medical film including a heat-resistant resin having a glass transition temperature measured by thermomechanical analysis TMA of 190° C. or higher wherein the medical film has a total light transmittance of 80% or higher at a thickness of 10 μm and a b* value in the L*a*b* color system of 10 or lower.

7 Claims, 1 Drawing Sheet

(56) References Cited

OTHER PUBLICATIONS

Kato, et al., "Transmission characteristics of polyimide-coated silver hollow glass-waveguides for medical applications", SPIE, 1994, vol. 2328, pp. 16-21.
Written Opinion (PCT/ISA/237) dated Sep. 26, 2017, by the Japanese Patent Office as the International Searching Authority for International Application No. PCT/JP2017/026208.

* cited by examiner

MEDICAL FILM AND METHOD FOR PRODUCING SAME, MEDICAL COATING COMPOSITION, MEDICAL DEVICE AND METHOD FOR PRODUCING SAME

TECHNICAL FIELD

The present invention relates to a medical film, a method of manufacturing the medical film, a medical coating composition, a medical instrument, and a method of manufacturing the medical instrument.

BACKGROUND ART

Medical instruments such as medical receptacles to be filled with a drug solution or blood need to have transparency which allows easy visual inspection of the contents of the receptacle so as to enable checking for inclusion of foreign matter or observation of a change caused by addition of a drug. Such medical instruments further need to have heat resistance, chemical resistance, and solvent resistance which are high enough to withstand heat sterilization.

Conventionally used medical receptacles meeting such performance requirements are glass receptacles. Glass receptacles require careful handling because, for example, they are susceptible to impact- or drop-induced breakage, they are heavy, and they can release dissolved alkali ions. Additionally, disposal of glass receptacles after use may be troublesome because, for example, their incineration is difficult or handling of their fragments is dangerous.

Resin materials such as polypropylene resin, polyethylene resin, vinyl chloride resin, ethylene-vinyl acetate copolymer resin, polystyrene resin, and polycarbonate resin are used as alternatives to glass. These resin materials are used in disposable, plastic medical receptacles, particularly from a hygiene perspective. However, these general-purpose resins have low heat resistance and are incapable of being steam-sterilized and, in addition, the solvent resistance of the resins is so low that a low-molecular-weight organic component or a halogen component may unfortunately be dissolved out.

Medical instruments as described above need to be aseptic and must therefore be sterilized. The sterilization is often carried out with an alcohol. However, when a medical instrument to be sterilized is made with a base material having low chemical resistance, the instrument is likely to experience solvent cracking which may lead to deterioration of the transparency of the instrument. When the medical instrument is made with a base material having low heat resistance, the instrument may be deformed by heat during heat sterilization such as steam sterilization, autoclave sterilization, or dry sterilization and may have a deteriorated transparency due to the influence of the deformation.

Other sterilization techniques include ethylene oxide gas sterilization and γ-radiation sterilization. However, medical receptacles may suffer from problems such as cracking or crazing due to the influence of the temperature (40 to 60° C.) or humidity during ethylene oxide sterilization, change in material properties due to deformation, and change in material properties due to γ-radiation. Thus, ethylene oxide gas sterilization and γ-radiation sterilization may be difficult to use in the medial fields.

Polyimide resin generally has high heat resistance and mechanical strength and may be employed as a base material for use in medical instruments. For example, a medical tool is known which has a conductor and an insulating layer covering the conductor and containing an aromatic polyimide (see PTL 1, for example). A bag-shaped article for heat treatment is also known which includes a multi-layer film having a commercially-available aromatic polyimide film and an adhesive fluorine resin layer (see PTL 2, for example). Further, there is known a medical instrument having a coating layer made of a cured product of a photocurable polyimide resin composition containing (a) a soluble polyimide, (b) carbon cluster and/or a derivative thereof, and (c) a hetero ring-containing compound (see PTL 3, for example).

CITATION LIST

Patent Literature

PTL 1
Japanese Patent Application Laid-Open No. 2014-195705
PTL 2
Japanese Patent Application Laid-Open No. 2006-326290
PTL 3
Japanese Patent Application Laid-Open No. 2004-242725

SUMMARY OF INVENTION

Technical Problem

However, the aromatic polyimide-containing insulating layer used in PTL 1 and the aromatic polyimide film used in PTL 2 have a resin-derived color and hence low transparency. Additionally, heat sterilization of a medical instrument having the insulating layer or aromatic polyimide film may intensify the coloring of the layer or film, thus causing a further decrease in transparency.

When a cured product of a photocurable polyimide resin composition is subjected to heat sterilization as described in PTL 3, the hue of the cured product may deteriorate, and consequently the transparency of the cured product may decrease. Further, since the photocurable polyimide resin composition contains a soluble polyimide, the solvent resistance and mechanical strength of the cured product may be low.

The present invention has been made in view of the above circumstances, and it is an object of the present invention to obtain a medical film superior in transparency, heat resistance, and solvent resistance.

Solution to Problem

[1] A medical film comprising a heat resistant resin having a glass transition temperature of 190° C. or higher as measured by thermal mechanical analysis (TMA), wherein the medical film has a total light transmittance of 80% or more and a b* value in L*a*b* color system of 10 or less when having a thickness of 10 μm.

[2] The medical film according to [1], wherein the medical film has a b* value in L*a*b* color system of 5 or less when having a thickness of 10 μm.

[3] The medical film according to [1] or [2], wherein the heat resistant resin is a polyimide.

[4] The medical film according to [3], wherein the polyimide comprises an imide unit represented by the following formula (1):

[Formula 1]

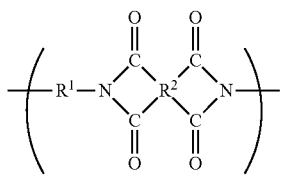

(1)

wherein

R¹ is an alicyclic diamine-derived group, and

R² is an aromatic tetracarboxylic dianhydride-derived group.

[5] The medical film according to [4], wherein: the alicyclic diamine-derived group is a group derived from an alicyclic diamine selected from the group consisting of 1,4-bis(aminomethyl)cyclohexane, trans-1,4-cyclohexyldiamine, and norbornanediamine; and the aromatic tetracarboxylic dianhydride-derived group is a group derived from an aromatic tetracarboxylic dianhydride selected from the group consisting of pyromellitic dianhydride, 3,3',4,4'-biphenyltetracarboxylic dianhydride, and bis(3,4-dicarboxyphenyl) ether dianhydride.

[6] The medical film according to any of [1] to [5], wherein the medical film has a thickness of 1 to 100 μm.

[7] The medical film according to any of [1] to [6], wherein the medical film is a multi-layer film comprising a layer containing a polyimide having a relatively high glass transition temperature and a layer containing a polyimide having a relatively low glass transition temperature.

[8] A method of manufacturing a medical film according to any of [1] to [7], comprising: obtaining a polyamide acid composition containing a polyamide acid containing an amide acid unit represented by the following formula (2):

[Formula 2]

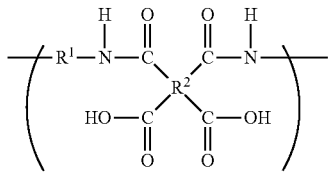

(2)

wherein

R¹ is an alicyclic diamine-derived group, and

R² is an aromatic tetracarboxylic dianhydride-derived group;

applying the polyamide acid composition onto a support, then subjecting the polyamide acid composition to a temperature elevation to a maximum reached temperature at an average temperature elevation rate of 1 to 10° C./min under an oxygen concentration of 5% or less, and then allowing imidization to proceed at the maximum reached temperature to obtain a cured product of the polyamide acid composition; and separating the cured product of the polyamide acid composition from the support to obtain a medical film.

[9] A medical instrument comprising a medical film according to any of [1] to [7].

[10] A method of manufacturing a medical instrument, comprising: folding a medical film according to any of [1] to [7] or stacking at least two medical films according to claim 1 to obtain a multi-layer body; and subjecting at least a part of the multi-layer body to thermal compression bonding to obtain a medical instrument in the form of a bag-shaped article.

[11] A medical coating composition comprising a polyamide acid, wherein a 10-μm-thick film made of a cured product of the medical coating composition has a total light transmittance of 80% or more and a b* value in L*a*b* color system of 10 or less.

[12] The medical coating composition according to [11], wherein the polyamide acid contains an amide acid unit represented by the following formula (2):

[Formula 3]

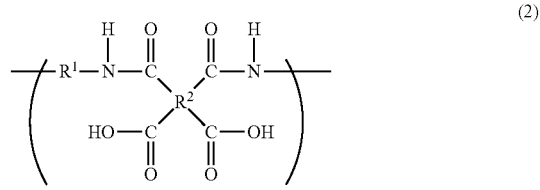

(2)

wherein

R¹ is an alicyclic diamine-derived group, and

R² is an aromatic tetracarboxylic dianhydride-derived group.

[13] The medical coating composition according to [12], wherein: the alicyclic diamine-derived group is a group derived from an alicyclic diamine selected from the group consisting of 1,4-bis(aminomethyl)cyclohexane, trans-1,4-cyclohexyldiamine, and norbornanediamine; and the aromatic tetracarboxylic dianhydride-derived group is a group derived from an aromatic tetracarboxylic dianhydride selected from the group consisting of pyromellitic dianhydride, 3,3',4,4'-biphenyltetracarboxylic dianhydride, and bis(3,4-dicarboxyphenyl) ether dianhydride.

[14] The medical coating composition according to any of [11] to [13] further comprising a solvent.

[15] A medical instrument comprising a medical instrument member and a coating layer made of a cured product of a medical coating composition according to any of [11] to [14].

[16] A method of manufacturing a medical instrument, comprising: coating a surface of a medical instrument member with a medical coating composition according to any of [11] to [14]; and heating the resulting layer of the medical coating composition in an inert gas atmosphere to obtain a medical instrument having the medical instrument member and a coating layer covering the surface of the medical instrument member, the coating layer being made of a cured product of the medical coating composition.

Advantageous Effects of Invention

The present invention can provide a medical film superior in transparency, heat resistance, and solvent resistance.

DESCRIPTION OF EMBODIMENTS

Figure 1:
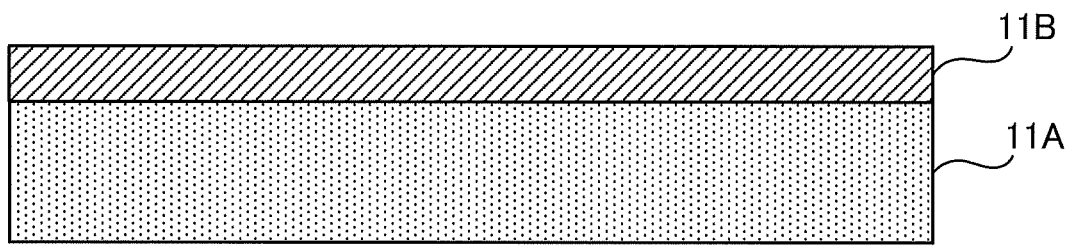
FIG. 1 is a schematic cross-sectional view illustrating an example of the medical film of the present invention.

The present inventors have found that a film obtained, for example, by 1) using a polyimide containing an alicyclic diamine-derived structural unit and 2) carrying out a forming process under certain forming conditions has high colorless transparency (a high total light transmittance and a low b* value). The inventors have further found that even when subjected to heat treatment, this film exhibits very little discoloration or deformation and can maintain high colorless transparency and have good shape retention. Such a film is suitable for use as a base material (packaging material or coating material) for forming a medical instrument that needs to have heat resistance which is high enough, for example, to withstand heat sterilization and transparency which is high enough to allow visual inspection of the contents of the instrument.

Additionally, the film has high resistance to load or deformation stress such as repeated folding, and this increases the suitability of the film as a base material (packaging material or coating material) for forming a medical instrument. The present invention has been made based on these findings.

1. Medical Film

A medical film of the present invention contains a heat-resistant resin having a glass transition temperature of 190° C. or higher.

1-1. Composition (Heat-Resistant Resin)

The medical film contains a heat-resistant resin having a glass transition temperature of 190° C. or higher. The heat-resistant resin having a glass transition temperature as high as 190° C. or higher is considered to have not only high heat resistance but also high solvent resistance due to increased interaction between the polymer molecules. The heat-resistant resin may be a thermoplastic resin. The glass transition temperature of the heat-resistant resin is preferably 200° C. or higher and more preferably 205° C. or higher.

The glass transition temperature refers to a temperature as measured by thermal mechanical analysis (TMA). The details of the measurement conditions are as described in Examples below.

The heat-resistant resin having a glass transition temperature of 190° C. or higher is preferably a polyimide because polyimides have good heat resistance and good solvent resistance.

The polyimide contains a diamine-derived structural unit and a tetracarboxylic dianhydride-derived structural unit. In order to increase the transparency of the polyimide and reduce the likelihood of coloring, it is preferable that the tetracarboxylic dianhydride-derived structural unit include a structural unit derived from an alicyclic tetracarboxylic dianhydride or that the diamine-derived structural unit include a structural unit derived from an alicyclic diamine. In order to achieve a higher transparency and further reduce the likelihood of coloring, it is preferable that the diamine-derived structural unit include at least a structural unit derived from an alicyclic diamine. That is, the polyimide preferably contains an imide unit represented by formula (1).

[Formula 4]

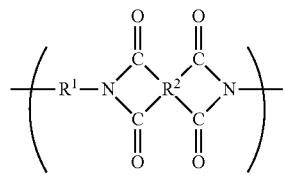

(1)

$R^1$ in formula (1) is a group derived from an alicyclic diamine. Examples of the alicyclic diamine include cyclobutanediamine, cyclohexyldiamine (including 1,4-cyclohexyldiamine), bis(aminomethyl)cyclohexane (including 1,4-bis(aminomethyl)cyclohexane), diaminobicycloheptane, diaminomethylbicycloheptane (including norbornanediamines such as norbornanediamine), diaminooxybicycloheptane, diaminomethyloxybicycloheptane (including oxanorbornanediamine), isophoronediamine, diaminotricyclodecane, diaminomethyltricyclodecane, bis(aminocyclohexyl)methane (or methylenebis(cyclohexylamine)), and bis(aminocyclohexyl)isopropylidene.

Among these, 1,4-bis(aminomethyl)cyclohexane, 1,4-cyclohexyldiamine, and norbornanediamine are preferred because they tend to increase the transparency of the film containing the polyimide and reduce the likelihood of coloring of the film.

Structural unit (X) derived from 1,4-bis(aminomethyl)cyclohexane can be either of the following two geometric isomers (cis/trans isomers). A trans isomer-derived structural unit is represented by formula (X1), while a cis isomer-derived structural unit is represented by formula (X2).

[Formula 5]

(X)

(X1)

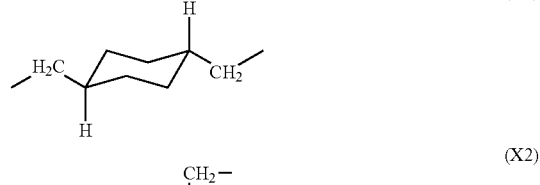

(X2)

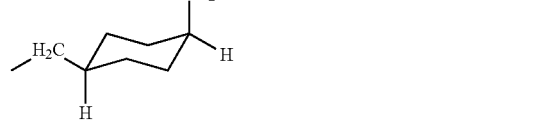

The ratio (X2/X1) between cis isomer (X2) and trans isomer (X1) of the 1,4-bis(aminomethyl)cyclohexane-derived structural unit is preferably 40/60 to 0/100 (molar ratio) and more preferably 20/80 to 0/100 (molar ratio) in order to increase the glass transition temperature of the polyimide. It should be noted that the total amount of trans isomer (X1) and cis isomer (X2) is 100 mol %. The glass transition temperature of the polyimide can be adjusted depending on, for example, the ratio (X2/X1) between cis isomer (X2) and trans isomer (X1), the structure of the diamine-derived structural unit, and the structure of the tetracarboxylic dianhydride-derived structural unit. For example, when it is desired to increase the glass transition temperature of the polyimide, the proportion of trans isomer (X1) may be increased, or the content of the alicyclic diamine-derived structural unit may be increased, or the content of a structural unit derived from a tetracarboxylic dianhydride having an aromatic skeleton and having a rigid, symmetric structure may be increased.

Likewise, structural unit (Y) derived from 1,4-cyclohexyldiamine can be either of the following two geometric isomers (cis/trans isomers). A trans isomer-derived structural unit is represented by formula (Y1), while a cis isomer-derived structural unit is represented by formula (Y2).

[Formula 6]

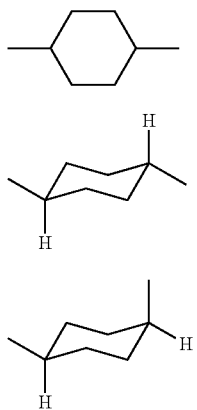

(Y)

(Y1)

(Y2)

The ratio (Y2/Y1) between cis isomer (Y2) and trans isomer (Y1) of the 1,4-cyclohexyldiamine-derived structural unit is preferably 50/50 to 0/100 (molar ratio) and more preferably 30/70 to 0/100 (molar ratio) in order to increase the glass transition temperature of the polyimide.

The alicyclic diamine-derived structural unit may consist of one type of alicyclic diamine-derived structural unit or may include two or more types of alicyclic diamine-derived structural units.

In order to increase the heat resistance and colorless transparency of the resulting film, the content of the alicyclic diamine-derived structural unit relative to 100 mol % of the total diamine-derived structural units is preferably 70 mol % or more and more preferably 80 mol % or more and may be 100 mol %.

The diamine-derived structural unit of the polyimide may additionally include structural units derived from diamines other than alicyclic diamines. Aromatic diamines which may be the other diamines are classified herein as other diamines I to III, and aliphatic diamines which may be the other diamines are classified herein as other diamines IV to VI.

An example of the other diamine I from which the additionally-included diamine-derived structural unit may be derived is a benzene ring-containing diamine. Examples of the benzene ring-containing diamine include:

<1> diamines containing one benzene ring, such as p-phenylenediamine, m-phenylenediamine, p-xylylenediamine, and m-xylylenediamine;

<2> diamines containing two benzene rings, such as 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, and 1-(3-aminophenyl)-1-(4-aminophenyl)-1-phenylethane;

<3> diamines containing three benzene rings, such as 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, and 2,6-bis(3-aminophenoxy)pyridine;

<4> diamines containing four benzene rings, such as 4,4'-bis(3-aminophenoxy)biphenyl, 4,4'-bis(4-aminophenoxy)biphenyl, bis[4-(3-aminophenoxy)phenyl] ketone, bis[4-(4-aminophenoxy)phenyl] ketone, bis[4-(3-aminophenoxy)phenyl] sulfide, bis[4-(4-aminophenoxy)phenyl] sulfide, bis[4-(3-aminophenoxy)phenyl] sulfone, bis[4-(4-aminophenoxy)phenyl] sulfone, bis[4-(3-aminophenoxy)phenyl] ether, bis[4-(4-aminophenoxy)phenyl] ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, and 2,2-bis[4-(4-aminophenoxy)phenyl]-1,1,1,3,3,3-hexafluoropropane;

<5> diamines containing five benzene rings, such as 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene; and <6> diamines containing six benzene rings, such as 4,4'-bis[4-(4-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, and 4,4'-bis[4-(4-aminophenoxy)phenoxy] diphenyl sulfone.

Examples of the other diamine II include diamines containing an aromatic substituent, such as 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

Examples of the other diamine III include spirobiindane ring-containing diamines such as 6,6'-bis(3-aminophenoxy)-3,3,3',3'-tetramethyl-1,1'-spirobiindane and 6,6'-bis(4-aminophenoxy)-3,3,3',3'-tetramethyl-1,1α-spirobiindane.

Examples of the other diamine IV include siloxane diamines such as 1,3-bis(3-aminopropyl)tetramethyldisiloxane, 1,3-bis(4-aminobutyl)tetramethyldisiloxane, α,ω-bis(3-aminopropyl)polydimethylsiloxane, and α,ω-bis(3-aminobutyl)polydimethylsiloxane.

Examples of the other diamine V include ethylene glycol diamines such as bis(aminomethyl) ether, bis(2-aminoethyl) ether, bis(3-aminopropyl) ether, bis[(2-aminomethoxy)ethyl] ether, bis[2-(2-aminoethoxy)ethyl] ether, bis[2-(3-aminopropoxy)ethyl] ether, 1,2-bis(aminomethoxy)ethane, 1,2-bis(2-aminoethoxy)ethane, 1,2-bis[2-(aminomethoxy)ethoxy] ethane, 1,2-bis[2-(2-aminoethoxy)ethoxy]ethane, ethylene glycol bis(3-aminopropyl) ether, diethylene glycol bis(3-aminopropyl) ether, and triethylene glycol bis(3-aminopropyl) ether.

Examples of the other diamine VI include alkylenediamines such as ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane.

$R^2$ in formula (1) is a group derived from a tetracarboxylic dianhydride. The tetracarboxylic dianhydride is not particularly limited, and examples thereof include an aromatic tetracarboxylic dianhydride and an alicyclic tetracarboxylic dianhydride.

Examples of the aromatic tetracarboxylic dianhydride include pyromellitic dianhydride, 3,3',4,4'-biphenyltetracarboxylic dianhydride, 3,3',4,4'-benzophenonetetracarboxylic dianhydride, bis(3,4-dicarboxyphenyl) ether dianhydride, bis(3,4-dicarboxyphenyl) sulfide dianhydride, bis(3,4-dicarboxyphenyl) sulfone dianhydride, bis(3,4-dicarboxyphenyl) methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,3-bis(3,4-dicarboxyphenoxy)benzene dianhydride, 1,4-bis(3,4-dicarboxyphenoxy) benzene dianhydride, 4,4'-bis(3,4-dicarboxyphenoxy) biphenyl dianhydride, 2,2-bis[(3,4-dicarboxyphenoxy) phenyl]propane dianhydride, 2,3,6,7-naphthalenetetracarboxylic dianhydride, 1,4,5,8-naphthalenetetracarboxylic dianhydride, 2,2',3,3α-benzophenonetetracarboxylic dianhydride, 2,2',3,3'-biphenyltetracarboxylic dianhydride, 2,2-bis(2,3-dicarboxyphenyl)propane dianhydride, 2,2-bis(2,3-dicarboxyphenyl)-1,1,1,3,3,3-hexafluoropropane dianhydride, bis(2,3-dicarboxyphenyl) ether dianhydride, bis(2,3-dicarboxyphenyl) sulfide dianhydride, bis(2,3-dicarboxyphenyl) sulfone dianhydride, 1,3-bis(2,3-dicarboxyphenoxy)benzene dianhydride, 1,4-bis(2,3-dicarboxyphenoxy)benzene dianhydride, 1,2,5,6-naphthalenetetracarboxylic dianhydride, 1,3-bis(3,4-dicarboxybenzoyl)benzene dianhydride, 1,4-bis(3,4-dicarboxybenzoyl)benzene dianhydride, 1,3-bis(2,3-dicarboxybenzoyl)benzene dianhydride, 1,4-bis(2,3-dicarboxybenzoyl)benzene dianhydride, 4,4'-isophthaloyldiphthalic anhydride, diazodiphenylmethane-3, 3',4,4'-tetracarboxylic dianhydride, diazodiphenylmethane-2,2',3,3'-tetracarboxylic dianhydride, 2,3,6,7-thioxanthonetetracarboxylic dianhydride, 2,3,6,7-anthraquinonetetracarboxylic dianhydride, 2,3,6,7-xanthonetetracarboxylic dianhydride, and ethylenetetracarboxylic dianhydride.

Examples of the alicyclic tetracarboxylic dianhydride include cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride, bicyclo[2.2.2]oct-7-en-2,3,5,6-tetracarboxylic dianhydride, bicyclo[2.2.2]octane-2, 3,5,6-tetracarboxylic dianhydride, 2,3,5-tricarboxycyclopentylacetic dianhydride, bicyclo[2.2.1] heptane-2,3,5-tricarboxylic-6-acetic dianhydride, 1-methyl-3-ethylcyclohex-1-en-3-(1,2),5,6-tetracarboxylic dianhydride, decahydro-1,4,5,8-dimethanonaphthalene-2,3, 6,7-tetracarboxylic dianhydride, 4-(2,5-dioxotetrahydrofuran-3-yl)-tetralin-1,2-dicarboxylic dianhydride, and 3,3',4, 4'-dicyclohexyltetracarboxylic dianhydride.

When the tetracarboxylic dianhydride contains an aromatic ring such as a benzene ring, part or all of the hydrogen atoms on the aromatic ring may be substituted by a group selected from a fluoro group, a methyl group, a methoxy group, a trifluoromethyl group, and a trifluoromethoxy group. Depending on the purpose, the tetracarboxylic dianhydride may further contain a group serving as a crosslinking site, the group being selected from an ethynyl group, a benzocyclobutene-4'-yl group, a vinyl group, an allyl group, a cyano group, an isocyanate group, a nitrilo group, and an isopropenyl group. The tetracarboxylic dianhydride may further contain in the main chain skeleton a group serving as a crosslinking site, such as a vinylene group, a vinylidene group, and an ethynylidene group, as long as the formability is not impaired.

In particular, in order to reduce deterioration in heat resistance and increase the glass transition temperature of the polyimide, the tetracarboxylic dianhydride is preferably an aromatic tetracarboxylic dianhydride. In order to further improve the solvent resistance and other properties, pyromellitic dianhydride, 3,3',4,4'-biphenyltetracarboxylic dianhydride, and bis(3,4-dicarboxyphenyl) ether dianhydride are more preferred. Only one type of aromatic tetracarboxylic dianhydride-derived structural unit may be contained, or two or more types of aromatic tetracarboxylic dianhydride-derived structural units may be contained.

The tetracarboxylic dianhydride-derived structural unit of the polyimide may further include a structural unit derived from a tetracarboxylic dianhydride other than the aromatic tetracarboxylic anhydrides described above.

In order to increase the heat resistance of the resulting film, the content of the aromatic tetracarboxylic dianhydride-derived structural unit relative to 100 mol % of the total tetracarboxylic dianhydride-derived structural units is preferably 70 mol % or more and more preferably 80 mol % or more, and may be 100 mol %.

Examples of the imide unit represented by formula (1) include various imide units depending on the combination of the diamine and tetracarboxylic dianhydride. The polyimide having the imide unit represented by formula (1) may be a homopolymer consisting of one type of imide unit or may be a random copolymer or block copolymer containing two or more types of imide units. The block copolymer is not particularly limited and may, in typical cases, be a multi-block copolymer having a plurality of linked blocks such as A-B-A-B-A-per polymer molecule for convenience of the polymerization process.

Examples of the polyimide having the imide unit represented by formula (1) include polyimides represented by the following formulae (1A) to (1F).

[Formula 7]

(1A)

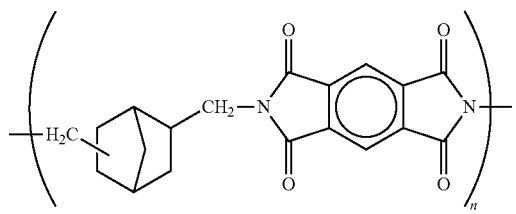

[Formula 8]

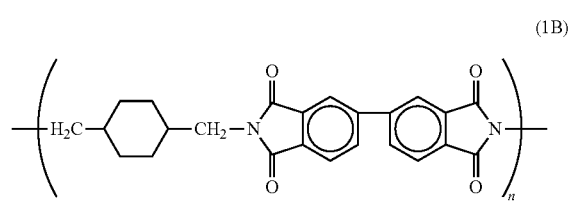
(1B)

[Formula 9]

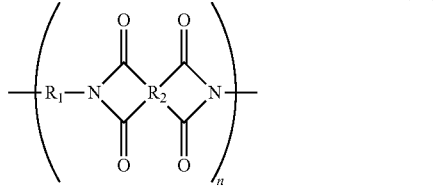
(1C)

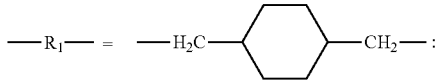

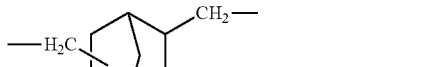

[Formula 10]

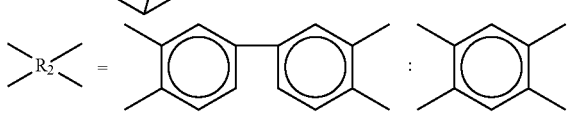
(1D)

[Formula 11]

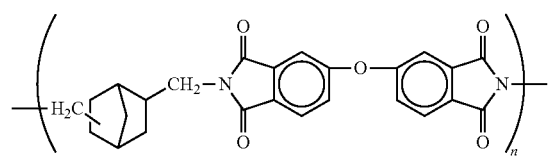
(1E)

—R₁— = —H₂C—⟨ ⟩—CH₂—: —(CH₂)₆—

[Formula 12]

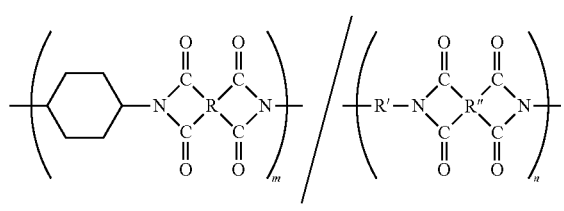
(1F)

(1F-1)    (1F-2)

In formulae (1A) to (1E), n represents the number of repeating units and is an integer of 2 or more. The ratios indicated for R₁ and R₂ in formula (1C) and for R₁ in formula (1E) are molar ratios.

In formula (1F), the ratio [average of m:average of n] is preferably 10:0 to 5:5. A film containing a block polyimide in which the ratio between the average of m and the average of n is within the above range can have good transparency and folding endurance.

The average of m is a value determined by dividing "the total number of structural units represented by formula (1F-1) in the polyimide" by "the total number of blocks made up of the structural units represented by formula (1F-1)". The average of n is a value determined by dividing "the total number of structural units represented by formula (1F-2) in the polyimide" by "the total number of blocks made up of the structural units represented by formula (1F-2)".

The ratio [average of m:average of n] is more preferably 10:0 to 7:3. When the ratio of the number m of repeating structural units represented by formula (1F-1) is equal to or higher than a certain level, thermal expansion coefficient of the polyimide is decreased. When the ratio of the number m is equal to or higher than a certain level, the visible light transmittance of the polyimide is increased. Since 1,4-cyclohexyldiamine is generally expensive, reducing the ratio of the number m of repeating structural units represented by formula (1F-1) can lead to cost reduction.

In all of "the blocks made up of the structural units represented by formula (1F-1)", the number of repeating structural units represented by formula (1F-1) is preferably 2 or more, more preferably 5 or more, and even more preferably 10 or more. The number of repeating structural units represented by formula (1F-1) is preferably 50 or less. When, as in these cases, all of "the blocks made up of the structural units represented by formula (1F-1)" contain not less than a predetermined number of structural units represented by formula (1F-1), the properties attributed to the blocks are likely to be obtained.

The content of the heat-resistant resin (preferably the polyimide) is preferably 70 to 100 mass % relative to the total mass of the medical film. When the content of the polyimide is 70 mass % or more, the heat resistance and transparency of the medical film are likely to be satisfactorily increased. The content of the polyimide is more preferably 80 to 100 mass % relative to the total mass of the medical film.

(Additional Component)

The medical film may further contain an additional component if necessary. Examples of the additional component may include the following materials as long as the above physical properties are not impaired: abrasion resistance improvers such as graphite, graphene, carbon nanotube, carborundum, molybdenum disulfide, and fluorine-based resin; electrical property improvers such as clay, mica, and kaolin; tracking resistance improvers such as asbestos, silica, and graphite; acid resistance improvers such as silica and calcium metasilicate; thermal conductivity improvers such as iron powder, zinc powder, and aluminum powder; and other additives such as glass beads, glass spheres, glass fibers, talc, diatomite, alumina, alumina hydrate, titania, Shirasu balloon, and fluorescence quenchers.

1-2. Layer Configuration

The medical film may be a single-layer film or a multi-layer film. The number of layers constituting the multi-layer film is not particularly limited and may be two or more. The two or more layers constituting the multi-layer film may have different compositions or different physical properties as long as the effect of the present invention is not impaired.

When the multi-layer film is viewed in plan, the multi-layered portion may extend over the entire surface of the film or be in a part of the film.

For example, when the medical film of the present invention is used as a base material for a bag-shaped article, it is desired that the medical film have not only high heat resistance but also a property (such as heat sealability) which renders the film capable of sealing without the use of any adhesive. In such a case, the medical film can be a multi-layer film having two or more layers having different glass transition temperatures and can be, for example, a multi-layer film having a layer containing a heat-resistant resin with a relatively high glass transition temperature (high-Tg layer) and a layer containing a heat-resistant resin with a relatively low glass transition temperature (low-Tg layer). The low-Tg layer may be provided only on an area of the high-Tg layer where sealing should be performed.

At least either the heat-resistant resin contained in the low-Tg layer or the heat-resistant resin contained in the high-Tg layer should be a heat-resistant resin as previously described which has a glass transition temperature of 190° C. or higher. These heat-resistant resins may be of the same type or different types. In order to ensure the formability and interlayer adhesion of the multi-layer film, the resins are preferably polyimides as previously described. The content of aliphatic diamine-derived structural units in the polyimide contained in the low-Tg layer is more preferably higher than the content of aliphatic diamine-derived structural units in the polyimide contained in the high-Tg layer.

That is, the polyimide contained in the low-Tg layer preferably contains an alicyclic diamine-derived structural unit and an aliphatic diamine-derived structural unit. The content ratio (molar ratio) between the alicyclic diamine-derived structural unit and the aliphatic diamine-derived structural unit can be, for example, 65/35 to 95/5 (alicyclic diamine-derived structural unit/aliphatic diamine-derived structural unit). A higher proportion of the aliphatic diamine tends to result in a lower Tg.

The Tg of the heat-resistant resin forming the low-Tg layer is preferably 190 to 240° C., and the Tg of the heat-resistant resin forming the high-Tg layer is preferably 250 to 300° C. The difference in Tg between the heat-resistant resin forming the low-Tg layer and the heat-resistant resin forming the high-Tg layer can be, for example, 30 to 110° C.

The ratio between the thickness of the low-Tg layer and the thickness of the high-Tg layer (low-Tg layer/high-Tg layer) can be 0.02 to 2. When this ratio is 0.02 or more, the heat sealability tends to be improved without deterioration in heat resistance, while when the ratio is 2 or less, the heat resistance can be increased without deterioration in heat sealability. When there are a plurality of low-Tg layers and a plurality of high-Tg layers, the thickness of the low-Tg layer refers to the total thickness of the plurality of low-Tg layers, and the thickness of the high-Tg layer refers to the total thickness of the plurality of high-Tg layers.

For the two or more layers constituting the multi-layer film, the difference in CTE between one layer and another adjacent layer is preferably small. This is because a small difference in CTE between one layer and another layer means a small difference in the amount of expansion upon application of heat, leading to reduction in the likelihood of delamination or deformation. The difference in CTE between one layer and another is preferably 40 ppm/K or less.

The coefficient of linear thermal expansion (CTE) of the medical film can be measured by the following method. That is, the medical film is cut to obtain a test specimen of a predetermined size. The elongation of the obtained test specimen is measured using TMA-50 available from Shimadzu Corporation, and the CTE is calculated from the slope of the temperature-elongation curve in the range from 100 to 200° C.

Examples of the layer configuration of such a multi-layer film include the following configurations.

High-Tg layer/Low-Tg layer
Low-Tg layer/High-Tg layer/Low-Tg layer
Low-Tg layer/Middle-Tg layer/High-Tg layer/Middle-Tg layer/Low-Tg layer FIG. 1 illustrates an example of the medical film of the present invention. As shown in FIG. 1, medical film 10 includes high-Tg layer 11A and low-Tg layer 11B.

High-Tg layer 11A can be, for example, a layer containing a polyimide having diamine-derived structural units consisting solely of alicyclic diamine-derived structural units. Low-Tg layer 11B can be, for example, a layer containing a polyimide having diamine-derived structural units including alicyclic diamine-derived structural units and aliphatic diamine-derived structural units. The ratio between the thickness of high-Tg layer 11A and the thickness of low-Tg layer 11B can be, for example, 0.02 to 2 (low-Tg layer/high-Tg layer). Medical film 10 can be used in such a manner that low-Tg layer 11B serves as a sealing surface.

The medical film having such a configuration is used, for example, in such a manner that low-Tg layer 11B forms the inner surface of a bag-shaped article to be obtained and, in this case, the bag-shaped article obtained can be sealed by heat lamination.

1-3. Physical Properties
(Total Light Transmittance)

The medical film of the present invention preferably has a total light transmittance of 80% or more when having a thickness of 10 μm. When the total light transmittance is 80% or more, for example, the use of the medical film of the present invention in a blood infusion bag or any other receptacle can provide high transparency which allows sufficient visual inspection of the contents of the bag or receptacle. The total light transmittance of the medical film with a thickness of 10 μm is more preferably 85% or more.

(Haze)

The haze of the medical film is preferably 2% or less and more preferably 1% or less. When the haze of the medical film is 2% or less, good transparency tends to be achieved.

The total light transmittance and haze of the medical film can be measured by the following procedures.

That is, the total light transmittance of the medical film is measured for the actual thickness of the medical film according to JIS-K 7136, using Haze Meter NDH 2000 available from Nippon Denshoku Industries Co., Ltd. The total light transmittance as calculated for a thickness of 10 μm is then determined according to Lambert law.

For measurement of the haze, the medical film is sliced to obtain a test specimen with a thickness of 10 μm. The haze of the obtained test specimen is measured according to JIS-K 7136 using Haze Meter NDH 2000 available from Nippon Denshoku Industries Co., Ltd.

The total light transmittance and haze of the medical film can be adjusted depending on the composition of the polyimide (the types and proportions of the structural units) and the film formation conditions. For example, in order to increase the total light transmittance of the medical film and reduce the haze (increase the transparency) of the medical film, it is preferable, for example, to increase the content of alicyclic diamine-derived structural units in the diamine-derived structural units constituting the polyimide or to select H-XDA or NBDA among alicyclic diamines. As for the film formation conditions, it is preferable, for example, to reduce the oxygen concentration in the ambient atmosphere during imidization to 5% or less (preferably 0.1% or less), or to increase the maximum reached temperature during imidization, or to decrease the average temperature elevation rate during imidization.

(Light Transmittance at Wavelength of 450 nm)

Further, the medical film is required to exhibit high transmittance over the entire wavelength region. Meanwhile, polyimides generally tend to readily absorb light at short wavelengths, and this may cause the medical film to present a yellow color. When the thickness of the medical film of the present invention is 10 μm, the light transmittance at a wavelength of 450 nm of the medical film is preferably 80% or more. When the light transmittance at a wavelength of 450 nm is 80% or more, then the light transmittance at short wavelengths is high, so that the medical film is likely to exhibit high transparency without presenting a yellowish color. Thus, the medical film can be used as a transparent film in substitution for glass, etc. The light transmittance at a wavelength of 450 nm of the medical film with a thickness of 10 μm is more preferably 83% or more and even more preferably more than 85%.

The light transmittance at a wavelength of 450 nm can be measured by the following method. That is, the light transmittance at a wavelength of 450 nm of the medical film is measured for the actual thickness of the medical film using an ultraviolet-visible spectrophotometer (such as MultiSpec-1500, available from Shimadzu Corporation). The light transmittance at 450 nm as calculated for a thickness of 10 μm is determined according to Lambert law.

(b* Value)

Films containing aromatic polyimides are often colored yellow; however, medical films are preferably as colorless as possible. The b* value in L*a*b* color system of the medical film of the present invention, as measured for a thickness of 10 μm, is preferably 10 or less. The medical film having a b* value within this range is uncolored (colorless and transparent), and therefore, for example, the color of the contents of a bag-shaped article made with the medical film can be accurately observed by visual inspection. Further, a colorless, transparent medical film can be used in an apparatus combining a light source and a light detector, in particular for measurement of biological information. When a sample to be measured is soft (such as when the sample is skin or an organ), the sensor itself needs to be soft (flexible) so as to follow the deformation of the sample. A colorless, transparent medical film having flexibility can be suitably used as a soft (flexible) biological information measurement sensor. The b* value in L*a*b* color system of the medical film of the present invention, as measured for a thickness of 10 μm, is more preferably 5 or less.

The b* value of the medical film can be measured by the following method. That is, the medical film is sliced to obtain a test specimen with a thickness of 10 μm. After calibration with a white standard plate, the b* value of the obtained test specimen is measured by means of Color Cute i available from Suga Test Instruments Co., Ltd., using the transmission mode and the optical measurement scheme 8° di.

The light transmittance at a wavelength of 450 nm and the b* value of the medical film can be adjusted depending on the composition of the polyimide (the types and proportions of the structural units) and the film formation conditions. For example, in order to increase the light transmittance at a wavelength of 450 nm of the medical film and decrease the b* value of the medical film (render the medical film colorless and transparent), it is preferable, for example, to increase the content of alicyclic diamine-derived structural units in the diamine-derived structural units constituting the polyimide, or to select H-XDA or NBDA among alicyclic diamines, or to select PMDA or BPDA among tetracarboxylic dianhydrides. As for the film formation conditions, it is preferable, for example, to reduce the oxygen concentration in the ambient atmosphere during imidization to 5% or less (preferably 0.1% or less, more preferably 0.01% or less), or to increase the maximum reached temperature during imidization, or to decrease the average temperature elevation rate during imidization.

(CTE)

The coefficient of linear thermal expansion (CTE) of the medical film of the present invention is preferably 5 to 60 ppm/K. When the coefficient of linear thermal expansion (CTE) of the medical film is 60 ppm/K or less, then heat-induced expansion is not so large. Thus, for example, the risk of separation between the adjacent layers in the multi-layer film or the risk of separation of the film from an adherend member is low. In order to avoid deterioration in adhesion between the medical film and a member (adherend member) to which the film is attached in use, the difference of the coefficient of linear thermal expansion (CTE) of the film from that of the adherend member is preferably small.

The coefficient of linear thermal expansion (CTE) of the medical film can be measured by the following method. That is, the medical film is sliced to obtain a test specimen with a thickness of 10 μm. The elongation of the obtained test specimen is measured using TMA-50 available from Shimadzu Corporation, and the CTE is calculated from the slope of the temperature-elongation curve in the range from 100 to 200° C.

(Tensile Strength)

The tensile strength of the medical film of the present invention is preferably 80 to 400 MPa. When the tensile strength is 80 MPa or more, sufficient mechanical strength tends to be achieved. The tensile strength of the medical film of the present invention is more preferably 100 to 350 MPa.

The tensile strength of the medical film can be measured by a tensile test. The test specimen and measurement conditions to be used are as described in Examples below.

The CTE and tensile strength of the medical film can be adjusted depending on the composition of the polyimide (the types and proportions of the structural units) and the film formation conditions. In order to decrease the CTE of the medical film and increase the tensile strength of the medical film, it is preferable, for example, to use an acid dianhydride having an aromatic skeleton, or to select a polyimide containing a structural unit derived from a diamine and/or acid dianhydride having a rigid, symmetrical structure, or to adjust the film formation conditions such as to decrease the average temperature elevation rate during imidization.

(Folding Endurance)

The number of folds at break of the medical film of the present invention in MIT folding endurance test is preferably 1,000 or more. When the number of folds at break of the medical film is 1,000 or more, then the medical film has sufficient pliability and is unlikely to suffer from a problem such as film rupture in actual use. The number of folds at break of the medical film in MIT folding endurance test is more preferably 3,000 or more and even more preferably 10,000 or more.

The number of folds at break of the medical film can be measured by MIT folding endurance test. The test specimen and measurement conditions to be used are as described in Examples below.

The folding endurance of the medical film can be adjusted depending on the composition of the polyimide (the types and proportions of the structural units) and the film formation conditions. In order to increase the folding endurance of the medical film, it is preferable for the polyimide, for example, to contain a structural unit derived from an aromatic ring-containing acid dianhydride or a structural unit derived from a diamine and/or acid dianhydride having a symmetrical structure and further contain a structural unit having a relatively flexible structure (e.g., a structural unit derived from an alicyclic diamine such as H-XDA or a structural unit derived from an aliphatic diamine). As for the film formation conditions, it is preferable, for example, to decrease the average temperature elevation rate during imidization.

(Solvent Resistance)

The medical film of the present invention can have good solvent resistance to ketones such as acetone, alcohols such as methanol and ethanol, phenols such as cresol, and other various solvents such as dimethyl sulfoxide (DMSO), N-methylpyrrolidone (NMP), N,N-dimethylacetamide (DMAc), and chloroform, in particular to alcohols such as methanol and ethanol. Specifically, the decrease in weight of the film after immersion at room temperature (22° C.) for 24 hours is preferably 5 mass % or less, more preferably 3 mass % or less, even more preferably 0 mass % (no dissolution), of the weight of the film before immersion.

The solvent resistance of the medical film can be adjusted depending on the composition of the polyimide (the types and proportions of the structural units). In order to increase the solvent resistance of the medical film, it is preferable, for example, to select 1,4-bis(aminomethyl)cyclohexane, trans-1,4-cyclohexyldiamine, or norbornanediamine as an alicyclic diamine and select pyromellitic dianhydride, 3,3',4,4'-biphenyltetracarboxylic dianhydride, or bis(3,4-dicarboxyphenyl) ether dianhydride as a tetracarboxylic dianhydride.

(Thickness)

The thickness of the medical film is preferably 0.5 to 200 μm, although the preferred thickness may differ depending on the intended use of the medical film. When the thickness of the medical film is 0.5 μm or more, sufficient mechanical strength is likely to be obtained, while when the thickness is 200 μm or less, the transparency and flexibility are unlikely to deteriorate. The thickness of the medical film is more preferably 1 to 100 μm.

1-4. Applications

The medical film of the present invention has high heat resistance and high transparency as described above. The medical film can therefore be suitably used as a base material for various medical instruments requiring heat resistance and transparency. Examples of such medical instruments include: bag-shaped articles such as blood infusion bags; covers (packaging materials) for catheters etc.; medical receptacles such as culture dishes and culture vessels; and components of medical equipment (equipment for diagnosis, testing, or treatment) or of medical wearable devices.

If necessary, a coating layer having a particular function may be stacked on the surface of the medical film of the present invention to form a medical multi-layer body. Such a medical multi-layer body can, like the medical film described above, be suitably used as a base material for medical instruments.

Examples of the surface coating layer of the medical multi-layer body include a coating layer for hydrophilicity improvement, a biologically-responsive stealth coating layer, a coating layer for hardness improvement, a coating layer as a barrier for water vapor penetration, and a coating layer as a barrier for oxygen penetration. In order to exploit the physical properties of the medical film, the thickness of the surface coating layer is preferably much smaller than the thickness of the medical film (for example, the thickness of the surface coating layer is 20% or less of the thickness of the medical film).

2. Method of Manufacturing Medical Film

The medical film of the present invention can be obtained, for example, through the steps of: 1) obtaining a precursor solution (polyamide acid composition) for the polyimide previously described; 2) applying the polyamide acid composition to a support and then drying and thermally curing (imidizing) the polyamide acid composition; and 3) separating the cured product of the polyamide acid composition from the support to obtain a medical film consisting of a polyimide film.

Step 1)

In this step, a polyamide acid composition containing a polyamide acid is prepared. The polyamide acid contained in the polyamide acid composition has an amide acid unit represented by formula (2).

[Formula 13]

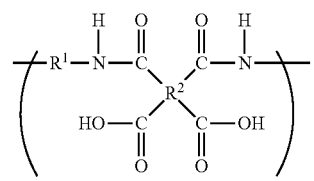

(2)

$R^1$ and $R^2$ in formula (2) are as defined for $R^1$ and $R^2$ in formula (1), respectively.

The polyamide acid may further contain an amide acid unit other than the amide acid unit represented by formula (2). The other amide acid unit may be similar to an imide unit contained in the polyimide other than the imide unit represented by formula (1), except that the imide skeleton of the other imide unit is replaced by an amide acid skeleton.

Examples of the polyamide acid containing an amide acid unit represented by formula (2) include polyamide acids of the following formulae (2A) to (2F).

[Formula 14]

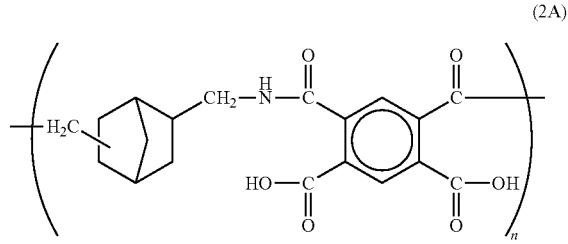

(2A)

[Formula 15]

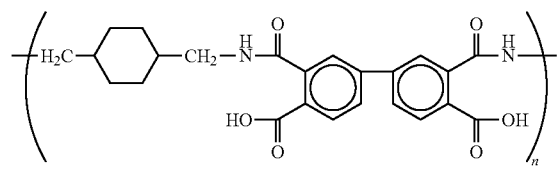

(2B)

[Formula 16]

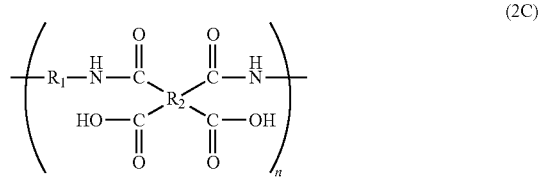

(2C)

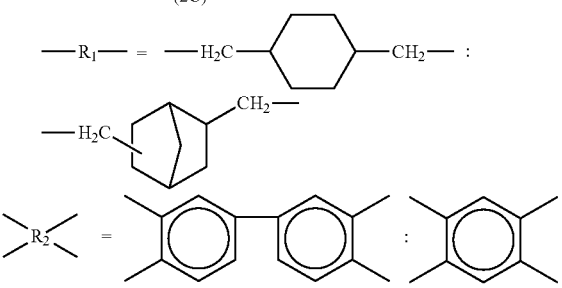

[Formula 17]

(2D)

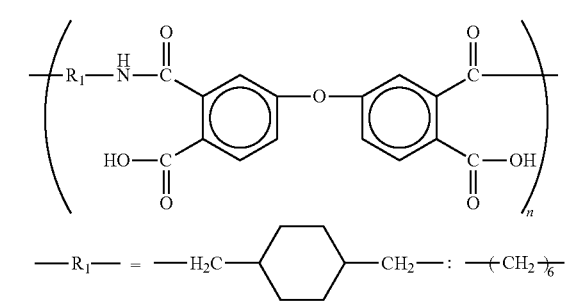

[Formula 18]

(2E)

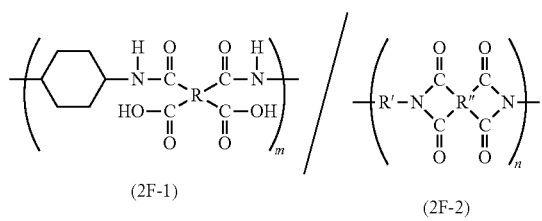

[Formula 19]

(2F)

In formulae (2A) to (2E), n is as defined for n in formulae (1A) to (1E). The ratios indicated for $R_1$ and $R_2$ in formula (2C) and for $R_1$ in formula (2E) are molar ratios.

The average of m, the average of n, R, R', and R" in formula (2F) are as defined for the average of m, the average of n, R, R', and R" in formula (1F), respectively.

The block polyamide acid imide represented by formula (2F) can be obtained, for example, by reaction of a diamine-terminated amide acid oligomer formed of structural units represented by the following formula (2F'-1) and a tetracarboxylic dianhydride-terminated imide oligomer formed of structural units represented by the following formula (2F'-2) in a solvent, followed by imidization.

[Formula 20]

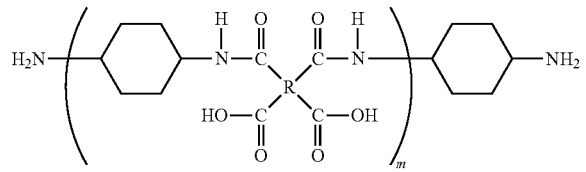

(2F'-1)

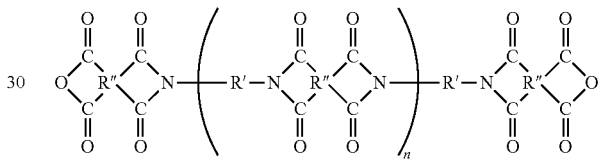

(2F'-2)

The polyamide acid composition may further contain a solvent if necessary. Examples of polar aprotic solvents which may be contained in the composition include: N-methylpyrrolidone, N,N-dimethylformamide, N,N-dimethylacetamide, dimethyl sulfoxide, hexamethylphosphoramide, and ether compounds such as 2-methoxyethanol, 2-ethoxyethanol, 2-(methoxymethoxy)ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol, tetrahydrofuran, dioxane, 1,2-dimethoxyethane, diethylene glycol dimethyl ether, and diethylene glycol diethyl ether. Examples of water-soluble alcohol solvents which may be contained in the composition include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetone alcohol.

These solvents may be used alone, or a mixture of two or more thereof may be used. Preferred examples of the solvent include N,N-dimethylacetamide, N-methylpyrrolidone, and a combination thereof.

The concentration of the polyamide acid is not particularly limited. In order to facilitate solvent removal by drying, the concentration of the polyamide acid can be, for example, 15 mass % or more relative to the total mass of the polyamide acid composition. In order to avoid deterioration in application properties of a varnish, the concentration of the polyamide acid can be, for example, 50 mass % or less relative to the total mass of the polyamide acid composition.

When N-methyl-2-pyrrolidone is used as the solvent, the logarithmic inherent viscosity at 35° C. of the polyamide acid composition (concentration: 0.5 g/dl) is preferably 0.1 to 3.0 dl/g. The reason is that in this case application of the polyamide acid composition is easy.

The logarithmic inherent viscosity of the polyamide acid composition can be measured by the following method. That is, the time of flow at 35° C. of the polyamide acid composition is measured with an Ubbelohde viscometer (n=3). Separately, blank measurement is conducted in which the time of flow at 35° C. of NMP solvent alone is measured with the same Ubbelohde viscometer. The values of the time of flow measured for the polyamide acid composition and the blank sample (solvent alone) are substituted into the following equation to determine the logarithmic inherent viscosity $\eta$inh. The concentration c is 0.5 g/dL, and the value employed as Tp is the average of three measurements (n=3).

$$\eta\text{inh} = \ln(Tp/Tb)/c$$

(Tp: Time of flow (sec) of polyamide acid composition
Tb: Time of flow (sec) of blank sample (solvent alone)
c: Concentration (g/dL) of polyamide acid composition).

The polyamide acid composition can be obtained, for example, by polymerizing the previously described alicyclic diamine and tetracarboxylic dianhydride in a polar aprotic solvent or water-soluble alcohol solvent.

The procedures for the polymerization reaction are not particularly limited. For example, first, a vessel equipped with a stirrer and a nitrogen inlet tube is prepared. The solvent described above is placed in the vessel purged with nitrogen, and the diamine is added in such an amount that the solids concentration of the resulting polyimide will be 30 wt %. The temperature of the resulting mixture is adjusted, and the mixture is stirred to dissolve the diamine. To the solution is added the tetracarboxylic dianhydride at a molar ratio of around 1, e.g., 0.95 to 1.05, relative to the diamine compound. The temperature of the resulting mixture is adjusted, and the mixture is stirred for about 1 to 50 hours, thereby the polyamide acid composition can be obtained.

Step 2)

The above polyamide acid composition is applied onto a support and then heated and dried (imidized) in an inert gas atmosphere to obtain a polyimide film as previously described.

The technique used to heat and dry the applied layer of the polyamide acid composition can be a common heating/drying oven. The internal atmosphere of the drying oven can be, for example, an atmosphere of air or inert gas (such as nitrogen or argon) and is preferably an inert gas atmosphere having an oxygen concentration of 5% or less. This is because a low oxygen concentration in the ambient atmosphere leads to reduced likelihood of coloring of the resulting film and hence reduced likelihood of decrease in total light transmittance of the film. In addition, the folding endurance and tensile strength of the resulting film are also likely to be improved. The oxygen concentration in the inert gas-based ambient atmosphere is more preferably 0.1% or less.

In heating and drying of the applied layer, the average temperature elevation rate in the range from 50 to 300° C. may be, for example, 0.25 to 50° C./min, preferably 1 to 10° C./min, and more preferably 2 to 5° C./min. The temperature elevation rate may be constant or may be varied in two or more steps. When the temperature elevation rate is varied in two or more steps, all the temperature elevation rates are preferably 0.25 to 50° C./min. In this case, the resulting film is unlikely to be colored and to have a decreased total light transmittance and, in addition, the film is likely to have an improved tensile strength and folding endurance. Further, the temperature elevation may be continuous or stepwise (sequential). Continuous temperature elevation is preferred to prevent poor appearance or imidization-induced blushing of the resulting film. The applied layer need not be heated to 300° C. When the final elevated temperature is lower than 300° C., the average temperature elevation rate in the range from 150° C. to the final elevated temperature is preferably 0.25 to 50° C./min.

In general, when the final elevated (maximum reached) temperature is relatively high and specifically (Tg±75)° C. (Tg is the glass transition temperature of the selected resin), more preferably (Tg±10)° C., even more preferably (Tg+10°) C or higher, the remaining solvent contained in the applied layer is more readily removed. Additionally, in this case, the resulting film is unlikely to be colored and to have a decreased total light transmittance. For example, the final elevated (maximum reached) temperature is preferably 200 to 300° C., more preferably 250 to 290° C., and even more preferably 270 to 290° C. The time of heating after the end of temperature elevation can be, for example, about 1 second to 10 hours.

The total light transmittance and b* value of the resulting medical film can be adjusted depending on the oxygen concentration in the ambient atmosphere, the average temperature elevation rate, and the final reached temperature during imidization. For example, in order to increase the total light transmittance of the resulting medical film and decrease the b* value of the film, it is preferable, after application of the polyamide composition to the support, to lower the oxygen concentration in the ambient atmosphere during imidization (the oxygen concentration is preferably 5% or less, more preferably 0.1% or less, and even more preferably 0.01% or less), increase the final reached temperature, and decrease the average temperature elevation rate.

The means used for application of the polyamide acid composition is not particularly limited and can be, for example, known means such as a spin coater, slit coater, die coater, comma coater, roll coater, gravure coater, curtain coater, spray coater, or lip coater.

When a multi-layer film is manufactured, in general, a polyimide film may be obtained as one layer in the manner described above, then another layer may be applied and formed on the polyimide film and subsequently imidized to obtain the multi-layer film. Alternatively, one layer and another layer may be co-cast and then imidized to obtain a multi-layer film.

Step 3)

After step 2), the cured product is separated from the support, and thus a polyimide film (medical film) can be obtained.

3. Medical Coating Composition

A cured product of the polyamide acid composition used in step 1) described in "2. Method of manufacturing medical film" above has high heat resistance and high transparency, and therefore the polyamide acid composition can be suitably used as a medical coating composition.

The medical coating composition can be used as a transparent coating material for a medical instrument member. Examples of the medical instrument member include scalpels, scissors, forceps, tweezers, needles, medical fibers, medical optical fibers, and medical optical sensors.

4. Medical Instrument

A medical instrument of the present invention includes a medical film or a cured product of a medical coating composition. The medical film can be a medical film as described in "1. Medical film" above, and the medical coating composition can be a medical coating composition as described in "3. Medical coating composition" above.

4-1. Examples of Applications in which Medical Film is Used

A medical instrument according to Embodiment 1 of the present invention includes a medical film. Examples of such a medical instrument include: various bag-shaped articles such as blood infusion bags; various covers (packaging materials) for catheters etc.; medical receptacles such as culture dishes and culture vessels; and components of medical equipment (equipment for diagnosis, testing, or treatment) or of medical wearable devices. Examples of the medical equipment and medical wearable devices include biological signal detection sensors, brain wave sensors, devices having a pressure sensor integrated in a medical catheter, and artificial skin equipped with pressure and temperature sensors. Examples of the components of the medical equipment and medical wearable devices include a component having a layered structure of a protective layer, an organic transistor (OTFT) layer, and a base material (medical film) which are arranged in the order mentioned.

The bag-shaped article may be a bag-shaped article having at least one opening portion. The bag-shaped article of the present invention is not limited to a bag-shaped article having one opening portion and may include a partially sealed article such as a tubular article having two opening portions.

Such a bag-shaped article is manufactured through the steps of: 1-1) folding one medical film or stacking two or more medical films to obtain a multi-layer body; and 1-2) sealing at least a part of an overlap between the medical films of the multi-layer body to obtain a bag-shaped medical instrument.

The sealing in step 1-2) may be carried out with an adhesive or may be carried out by thermal compression bonding. When the medical film is a multi-layer film including a low-Tg layer as previously described, the sealing can be successfully accomplished by thermal compression bonding.

4-2. Examples of Applications in which Medical Coating Composition is Used

A medical instrument according to Embodiment 2 of the present invention includes a medical instrument member and a coating layer made of a cured product of a medical coating composition.

Examples of the medical instrument member include scalpels, scissors, forceps, tweezers, needles, medical fibers, medical optical fibers, and medical optical sensors.

The coating layer is a layer made of a cured product of a medical coating composition. It suffices for the coating layer to cover at least a part of the surface of the medical instrument member. The thickness of the coating layer depends on the type and purpose of the medical instrument member and can be, for example, about 0.1 to 50 µm.

Such a medical instrument is manufactured through the steps of: 2-1) coating the surface of the medical instrument member with the medical coating composition; and 2-2) heating the resulting layer of the medical coating composition in an inert gas atmosphere to obtain a medical instrument having the medical instrument member with the surface coated with a cured product of the medical coating composition.

The technique for coating in step 2-1) is not particularly limited and can be, for example, spray coating or dip coating.

The imidization conditions (such as the imidization temperature, average temperature elevation rate, and oxygen concentration) in step 2-2) depend on the type and material of the medical instrument member and can be the same as the imidization conditions (such as the imidization temperature, average temperature elevation rate, and oxygen concentration) in step 2) described in "2. Method of manufacturing medical film" above.

EXAMPLES

Hereinafter, the present invention will be described in more detail with reference to Examples. The scope of the present invention should not be restrictively interpreted by these Examples.

1. Materials Used for Synthesis of Polyamide Acid

<Diamine>
H-XDA: 1,4-Bis(aminomethyl)cyclohexane (trans isomer: 85 mol %, cis isomer: 15 mol %)
NBDA: Norbornanediamine
CHDA: Trans-1,4-cyclohexyldiamine
HMDA: 1,6-Hexamethylenediamine
ODA: 4,4'-Diaminodiphenyl ether [4,4'-oxydianiline]
APB: 1,3-Bis(3-aminophenoxy)benzene
<Acid Dianhydride>
PMDA: Pyromellitic dianhydride
BPDA: 3,3',4,4'-Biphenyltetracarboxylic dianhydride
ODPA: Bis(3,4-dicarboxyphenyl) ether dianhydride
6FDA: 2,2-Bis(3,4-dicarboxyphenyl)-1,1,1,3,3,3-hexafluoropropane dianhydride
H-PMDA: 1,2,4,5-Cyclohexanetetracarboxylic dianhydride
<Solvent>
NMP: N-methylpyrrolidone
DMAc: N,N-dimethylacetamide
DMI: 1,3-Dimethyl-2-imidazolidinone

2. Synthesis of Polyamide Acid Solution (Polyamide Acid Composition)

Synthesis Example 1

A 1 L five-necked separable flask (reaction vessel) equipped with a thermometer, a stirrer, and a nitrogen inlet tube was charged with 35.5 g (0.250 mol) of H-XDA, 73.2 g (0.249 mol) of BPDA, and 616 g of NMP at room temperature. The reaction vessel was placed in an oil bath held at 80° C. for 1 hour. During this period, a salt formed at 5 to 10 minutes, but this salt quickly dissolved, and a homogeneous solution was obtained. The oil bath was removed, and the solution was then stirred at room temperature for 18 hours to obtain a homogeneous polyamide acid solution (varnish).

Synthesis Example 2

A 1.5 L five-necked separable flask (reaction vessel) equipped with a thermometer, a stirrer, a nitrogen inlet tube, and a dropping funnel was charged with 153 g (0.700 mol) of PMDA and 420 g of DMAc as a solvent. The reaction vessel was placed in an ice bath at 0° C., and the contents of the reaction vessel were stirred to give a slurry liquid. A solution containing 108 g (0.700 mol) of NBDA and 189 g of DMAc was introduced in the dropping funnel and added dropwise to the slurry liquid over 2 hours. After the dropwise addition, the ice bath was removed, and the liquid was then stirred at room temperature for 18 hours to obtain a polyamide acid solution (varnish).

Synthesis Example 3

A 300 mL five-necked separable flask (reaction vessel) equipped with a thermometer, a stirrer, and a nitrogen inlet tube was charged with 11.4 g (0.100 mol) of CHDA, 25.9 g (0.0880 mol) of BPDA, and 149 g of NMP as a solvent at room temperature. The reaction vessel was placed in an oil bath held at 90° C. for 1 hour. During this period, a salt formed at about 10 minutes, but this salt quickly dissolved, and a homogeneous solution was obtained. The oil bath was removed, and the solution was then stirred at room temperature for 18 hours to obtain a solution (varnish) of an oligoamide acid having a terminal amino group derived from CHDA.

Next, a 200 mL five-necked separable flask (reaction vessel) equipped with a thermometer, a stirrer, and a nitrogen inlet tube was charged with 6.19 g (0.0402 mol) of NBDA, 15.3 g (0.0522 mol) of BPDA, and 64.5 g of DMI as a solvent at room temperature. The reaction vessel was placed in an oil bath held at 120° C. for 5 minutes. During this period, salt formation and quick dissolution were observed as in the above examples. Upon this observation, a cooling tube and a Dean-Stark condenser were attached to the separable flask, and 15 g of xylene was added to the reaction solution, which was stirred to allow a dehydration/thermal imidization reaction to proceed at 190° C. for 4 hours. Finally, xylene was distilled off to obtain a solution (varnish) of an oligoimide having a terminal acid anhydride structure derived from BPDA.

All of the obtained oligoamide acid varnish and all of the obtained oligoimide varnish were then mixed, and 120 g of NMP was added to dilute the mixture to about 15%. Thus, a multi-block polyamide acid imide varnish was obtained.

Synthesis Example 4

A polyamide acid solution (varnish) was obtained in the same manner as in Synthesis Example 1, except that H-XDA (0.250 mol) used in Synthesis Example 1 was replaced by 4.05 g (0.0260 mol) of NBDA and 31.8 g (0.224 mol) of H-XDA, and that BPDA (0.249 mol) used in Synthesis Example 1 was replaced by 5.70 g (0.0260 mol) of PMDA and 65.5 g (0.223 mol) of BPDA.

Synthesis Example 5

A polyamide acid solution (varnish) was obtained in the same manner as in Synthesis Example 1, except that H-XDA (0.250 mol) used in Synthesis Example 1 was replaced by 28.5 g (0.250 mol) of CHDA.

Synthesis Example 6

A polyamide acid solution (varnish) was obtained in the same manner as in Synthesis Example 2, except that 153 g (0.700 mol) of PMDA and 420 g of DMAc as a solvent, which were used in Synthesis Example 2, were replaced respectively by 217 g (0.700 mol) of ODPA and 786 g of DMAc as a solvent.

Synthesis Example 7

A polyamide acid solution (varnish) was obtained in the same manner as in Synthesis Example 2, except that PMDA (0.700 mol) and 420 g of DMAc as a solvent, which were used in Synthesis Example 2, were replaced respectively by 217 g (0.700 mol) of ODPA and 750 g of NMP as a solvent, and that 108 g (0.700 mol) of NBDA and 189 g of DMAc as a solvent, which were used in Synthesis Example 2, were replaced by 79.5 g (0.560 mol) of H-XDA, 16.2 g (0.140 mol) of HMDA, and 189 g of NMP as a solvent.

Synthesis Example 8

A 1.5 L five-necked separable flask (reaction vessel) equipped with a thermometer, a stirrer, and a nitrogen inlet tube was charged with 50.0 g (0.250 mol) of ODA and 591 g of NMP, which were mixed to give a homogeneous solution. The reaction vessel was then placed in an ice bath at 0° C., and the solution was stirred. To the homogeneous solution was added 54.3 g (0.249 mol) of PMDA in the form of powder, and the mixture was stirred for 3 hours in the ice bath. During this period, the mixture underwent an increase in viscosity to become a slurry, from which the mixture changed to a homogeneous solution. The ice bath was removed, and the solution was then stirred at room temperature for 18 hours to obtain a homogeneous polyamide acid solution (varnish).

Synthesis Example 9

A polyamide acid solution (varnish) was obtained in the same manner as in Synthesis Example 2, except that 153 g (0.700 mol) of PMDA and 420 g of DMAc as a solvent were replaced respectively by 186 g (0.600 mol) of ODPA and 643 g of NMP as a solvent, and that 108 g (0.700 mol) of NBDA and 189 g of DMAc as a solvent were replaced by 59.7 g (0.420 mol) of H-XDA, 20.8 g (0.180 mol) of HMDA, and 162 g of NMP as a solvent.

Synthesis Example 10

A polyamide acid solution (varnish) was obtained in the same manner as in Synthesis Example 2, except that 153 g (0.700 mol) of PMDA and 420 g of DMAc as a solvent were replaced respectively by 267 g (0.600 mol) of 6FDA and 643 g of NMP as a solvent, and that 108 g (0.700 mol) of NBDA and 189 g of DMAc as a solvent were replaced by 42.6 g (0.300 mol) of H-XDA, 34.2 g (0.300 mol) of CHDA, and 162 g of NMP as a solvent.

Synthesis Example 11

A polyamide acid solution (varnish) was obtained in the same manner as in Synthesis Example 2, except that 153 g (0.700 mol) of PMDA was replaced by 311 g (0.700 mol) of 6FDA.

Synthesis Example 12

A polyamide acid solution (varnish) was obtained in the same manner as in Synthesis Example 2, except that 153 g (0.700 mol) of PMDA and 420 g of DMAc as a solvent were replaced respectively by 112 g (0.500 mol) of 1,2,4,5-cyclohexanetetracarboxylic dianhydride (H-PMDA) and 590 g of DMAc, and that 108 g (0.700 mol) of NBDA and 189 g of DMAc as a solvent were replaced by 146 g (0.500 mol) of 1,3-bis(3-aminophenoxy)benzene (APB) and 184 g of DMAc as a solvent.

The logarithmic inherent viscosity of the varnishes obtained in Synthesis Examples 1 to 12 was measured by the following method.

[Logarithmic Inherent Viscosity]

NMP solvent was used to prepare a polyamide acid solution in which the concentration of solids of the polyamide acid was 0.5 dL/g. Next, the time of flow at 35° C. of the polyamide acid solution was measured with an Ubbelohde viscometer (n=3). Separately, blank measurement was conducted in which the time of flow at 35° C. of NMP solvent alone was measured with the same Ubbelohde viscometer. The values of the time of flow measured for the polyamide acid solution and the blank sample (solvent alone) were substituted into the following equation to determine the logarithmic inherent viscosity ($\eta$inh). The concentration c was 0.5 g/dL, and the value employed as Tp was the average of three measurements (n=3).

$$\eta\text{inh} = \ln(Tp/Tb)/c$$

(Tp: Time of flow (sec) of polyamide acid solution
Tb: Time of flow (sec) of blank sample (solvent)
c: Concentration (g/dL) of polyamide acid solution)

The results of evaluation of the polyamide acid varnishes obtained in Synthesis Examples 1 to 12 are shown in Table 1.

Next, the resulting polyamide acid solution was cast onto a glass substrate (A3 size) using a doctor blade. The substrate with the solution was quickly transferred to an inert oven, in which the temperature was elevated from 50° C. to 280° C. over 2 hours under a nitrogen stream at an oxygen concentration of 0.01% (in Example 8, the oxygen concentration was less than 0.01%). The elevated temperature of 280° C. was maintained for 2 hours to obtain a colorless, transparent cured product having self-supporting ability and a thickness of 15 to 25 μm.

The obtained cured product was slit at its edge to allow the cured product to spontaneously separate from the glass substrate, and thus a 25-cm-square or larger polyimide film having self-supporting ability was obtained.

Comparative Examples 1 to 6

The following films (or sheets) were prepared.
Film of Synthesis Example 8
PP (polypropylene): PP available from King Jim Co., Ltd. (transparent pocket, No. 103-100, A4-S, thickness: 35 μm)
PS (polystyrene): PS case available from Sanplatec Corporation (8.5×5.5, thickness: 1.5 mm)
PC (polycarbonate): PC sheet available from C.I. TAKIRON Corporation (product name: PC-1600, thickness: 2 mm)
PET (polyethylene terephthalate): PET available from Toray Industries, Inc. (product name: Lumirror S10, thickness: 100 μm)

TABLE 1

| | Polyamide acid solution | | | | | |
|---|---|---|---|---|---|---|
| | Diamine | | Acid anhydride | | | Logarithmic inherent viscosity |
| | Type | Content (mol %) | Type | Content (mol %) | Form of polymer | (dL/g) |
| Synthesis Example 1 | H-XDA | 100 | BPDA | 100 | Homopolymer | 1.25 |
| Synthesis Example 2 | NBDA | 100 | PMDA | 100 | Homopolymer | 0.72 |
| Synthesis Example 3 | CHDA/NBDA | 71/29 | BPDA | 100 | Block copolymer | 1.22 |
| Synthesis Example 4 | H-XDA/NBDA | 90/10 | BPDA/PMDA | 90/10 | Random copolymer | 1.01 |
| Synthesis Example 5 | CHDA | 100 | BPDA | 100 | Homopolymer | 1.49 |
| Synthesis Example 6 | NBDA | 100 | ODPA | 100 | Homopolymer | 0.61 |
| Synthesis Example 7 | H-XDA/HMDA | 80/20 | ODPA | 100 | Random copolymer | 0.82 |
| Synthesis Example 8 | ODA | 100 | PMDA | 100 | Homopolymer | 1.93 |
| Synthesis Example 9 | H-XDA/HMDA | 70/30 | ODPA | 100 | Random copolymer | 0.94 |
| Synthesis Example 10 | H-XDA/CHDA | 50/50 | 6FDA | 100 | Random copolymer | 0.92 |
| Synthesis Example 11 | NBDA | 100 | 6FDA | 100 | Homopolymer | 0.43 |
| Synthesis Example 12 | APB | 100 | H-PMDA | 100 | Homopolymer | 0.30 |

3. Production and Evaluation of Polyimide Film (Medical Film)

Examples 1 to 11

Each of the polyamide acid solutions obtained in Synthesis Examples 1 to 12 was first subjected to foreign matter removal and defoaming by pressure filtration (filter diameter: 10 μm).

PMMA (polymethyl methacrylate): Acrylic sheet available from Nitto Jushi Kogyo Co., Ltd. (product name: CLAREX H001, thickness: 2 mm)

The hue and post-sterilization appearance of the films obtained in Examples 1 to 11 and Comparative Examples 1 to 6 were evaluated by visual inspection. The sterilization and the evaluation of the post-sterilization appearance were conducted by the following methods.

[Post-Sterilization Appearance]
1) Autoclave Sterilization

The film (or sheet) obtained was put in a simple sterilization pouch available from Thermo Fisher Scientific K.K. The pouch was then placed in a specialized container, and this container was set in a high-pressure steam sterilizer (HA-300MIV, available from Hirayama Manufacturing Corporation), in which sterilization was performed at 121° C. for 20 minutes. After the sterilization, the test specimen was taken out of the sterilizer and allowed to stand at room temperature overnight. After that, the test specimen was examined for change in appearance and deformation by visual inspection. Evaluation was made according to the following criteria.

A: The sample showed neither change in appearance (such as discoloration or cloudiness) nor deformation after sterilization, and it was determined that the result was good.

B: The sample showed a change in appearance (such as discoloration or cloudiness) or deformation after sterilization, and it was determined that the result was poor.

2) Dry Heat Sterilization

The film (or sheet) obtained was set in a stainless-steel tray of a dry heat treatment oven (Drying Oven DX602 available from Yamato Scientific Co., Ltd.), in which sterilization was performed at 180° C. for 3 hours. After the sterilization, the film (or sheet) was allowed to stand at room temperature overnight and then examined for change in appearance and deformation by visual inspection. Evaluation was made according to the same criteria as above.

The results of evaluation of the films obtained in Examples 1 to 11 and Comparatives Example 1 to 6 are shown in Table 2. In table 2, "-" means that measurement was not conducted.

It is seen from Table 2 that all the polyimide films of Examples 1 to 11 were colorless and transparent, and underwent little change in appearance (such as discoloration) or deformation and successfully maintained the colorless, transparent state after sterilization.

For the film of Comparative Example 1, it is seen that the film was colored yellow, although the film showed neither change in appearance (such as discoloration) nor deformation after sterilization and had transparency. For the films (or sheets) of Comparative Examples 2 to 6, it is seen that they showed a change in appearance (such as discoloration) or deformation after sterilization, although all of them were colorless and transparent.

For Examples 1 to 11 in which the post-sterilization appearance was good as shown in Table 2, the thermal properties (glass transition temperature and CTE), optical properties (total light transmittance, haze, b*value, and light transmittance at 450 nm), mechanical properties (folding endurance, tensile strength, and tensile elongation), and chemical properties (solvent resistance) of the films were further evaluated by the following methods.

[Preparation of Films]

First, three films were prepared for each of Examples 1 to 11. One of the films was not treated, another was subjected to autoclave sterilization as described above, and the other was subjected to dry heat sterilization described above.

[Evaluation]

The following evaluations 1) to 7) were carried out for the films of Examples. The evaluations 1) to 6) were carried out for all of the untreated films, the films subjected to autoclave sterilization, and the films subjected to dry heat sterilization, and the evaluation 7) was made only for the untreated films. The film of Comparative Example 1 was not subjected to the

TABLE 2

|  | Type | Thickness (μm) | Hue (visual inspection) | Post-sterilization appearance | |
| --- | --- | --- | --- | --- | --- |
|  |  |  |  | After autoclave sterlization 121° C. | After dry heat sterilization 180° C. |
| Example 1 | Synthesis Example 1 | 15 | Colorless and transparent | A | A |
| Example 2 | Synthesis Example 2 | 26 | Colorless and transparent | A | A |
| Example 3 | Synthesis Example 3 | 19 | Colorless and transparent | A | A |
| Example 4 | Synthesis Example 4 | 21 | Colorless and transparent | A | A |
| Example 5 | Synthesis Example 5 | 20 | Colorless and transparent | A | A |
| Example 6 | Synthesis Example 6 | 22 | Colorless and transparent | A | A |
| Example 7 | Synthesis Example 7 | 19 | Colorless and transparent | A | A |
| Example 8 | Synthesis Example 9 | 21 | Colorless and transparent | A | A |
| Example 9 | Synthesis Example 10 | 16 | Colorless and transparent | A | A |
| Example 10 | Synthesis Example 11 | 17 | Colorless and transparent | A | A |
| Example 11 | Synthesis Example 12 | 29 | Colorless and transparent | A | A |
| Comparative Example 1 | Synthesis Example 8 | 20 | Yellow and transparent | A | A |
| Comparative Example 2 | PP | 35 | Colorless and semi-transparent | B | — |
| Comparative Example 3 | PS | 1500 | Colorless and transparent | B | — |
| Comparative Example 4 | PC | 2000 | Colorless and transparent | B | — |
| Comparative Example 5 | PET | 100 | Colorless and transparent | B | B |
| Comparative Example 6 | PMMA | 2000 | Colorless and transparent | B | B | evaluations 1) to 7) because the color of this film was pale yellow, although the film had a good result in that it showed no change after the sterilization.

1) Glass Transition Temperature Tg (Unit: ° C.) and Coefficient of Linear Thermal Expansion CTE (Unit: Ppm/K)

TMA-50 available from Shimadzu Corporation was used to measure the elongation of the films under an air stream at a temperature elevation rate of 5° C./min and a load per unit cross-sectional area of 14 g/mm². Tg was assumed to be an inflection point on the temperature-elongation curve obtained and was determined from an intersection of a tangent line with the curve. CTE was calculated from the slope of the temperature-elongation curve in the range from 100 to 200° C.

2) Total Light Transmittance (Unit: %) and Haze (Unit: %)

The total light transmittance and haze of the films were measured according to JIS-K 7136 using Haze Meter NDH 2000 available from Nippon Denshoku Industries Co., Ltd.

3) b* Value (Unit:-)

The b* value in L*a*b* color system of the films was measured by means of Color Cute i available from Suga Test Instruments Co., Ltd., using the transmission mode and the optical measurement scheme 8° di. The measurement was conducted after calibration with a white standard plate.

4) Light Transmittance at 450 nm (Unit: %)

Ultraviolet-visible spectra of the films were measured using MultiSpec-1500 (available from Shimadzu Corporation). In this measurement, the light transmittance at a wavelength of 450 nm was measured. The light transmittance at 450 nm as calculated for a thickness of 10 μm was determined according to the Lambert law from the measured light transmittance at a wavelength of 450 nm (the light transmittance for the actual thickness).

5) Folding Endurance (MIT, Unit: Folds)

The film was cut into an about 120-mm-long and 15-mm-wide piece, which was used as a test specimen. This test specimen was set in a MIT folding endurance tester (No. 307) available from Yasuda Seiki Seisakusho, Ltd., and the number of folds required to cause the test specimen to break was measured at a radius curvature of 0.38 mm, a load of 0.5 Kg, a folding angle of 270 degrees (135 degrees to the right and 135 degrees to the left), and a folding rate of 175 folds/min.

For the folding endurance, a MIT folding endurance tester (available from Yasuda Seiki Seisakusho, Ltd., No. 307) was used to fold the test specimen to rightward and leftward repeatedly by moving one end of the test specimen with the other end fixed. The number of folds required to cause the test specimen to break was measured. The measurement conditions were as shown below.

In this test, a fold of the test specimen in one direction was counted as one fold. The test was repeated three times, and the arithmetic mean of the results of the three tests was rounded to two significant figures, and the thus calculated value was employed as a measurement result of the folding endurance. The upper limit of the measurement result of the folding endurance was set to 1,000,000 folds.

(Measurement Conditions)

Radius curvature: R=0.38 mm

Load: 0.5 kgf

Folding angle: 270° (135° to the right and 135° to the left)

Folding rate: 175 folds/min

Number of tests: n=3

6) Tensile Strength (Unit: MPa) and Tensile Elongation (Unit: %)

The film was cut into the shape of a dumbbell to obtain a dumbbell test specimen having a marked line-to-marked line distance of 5 mm and a test length of 30 mm. For this test specimen, a stress-strain curve was obtained by using EZ-S tensile tester available from Shimadzu Corporation to pull the test specimen at a tensile speed of 30 mm/min and measure the stress required to cause the test specimen to break and the elongation at break. The values of stress and strain at the point of breakage in the obtained curve were determined as the tensile strength and tensile elongation. Averages of five measurements were employed.

7) Solvent Resistance

The film was cut into a 5-cm-square piece to obtain a test specimen. This test specimen was placed in a petri dish filled with a solvent (acetone, methanol, ethanol, cresol, dimethyl sulfoxide (DMSO), N-methylpyrrolidone (NMP), N,N-dimethylacetamide (DMAc), or chloroform) so as to be fully immersed in the solvent. The test specimen was stored in this state at room temperature (22° C.) for 24 hours. After that, the test specimen was taken out of the petri dish, and the appearance of the test specimen was visually inspected and evaluated according to the following criteria.

5: The test specimen showed no change in appearance.

4: The test specimen was not dissolved, but had curls, wrinkles, or surface cloudiness.

3: The test specimen was dissolved, and the dissolved amount corresponded to 3 mass % or less of the non-immersed test specimen.

2: The test specimen was dissolved at an acceptable level; the dissolved amount corresponded to more than 3 mass % and not more than 5 mass % of the non-immersed test specimen.

1: The test specimen was dissolved at an unacceptable level; the dissolved amount corresponded to more than 5 mass % of the non-immersed test specimen.

When the rating was 2 or higher, the solvent resistance was determined to be at an acceptable or higher level.

The results of evaluations 1) to 6) of Examples 1 to 7 are shown in Table 3, and the results of evaluations 1) to 6) of Examples 8 to 11 are shown in Table 4. The results of evaluation 7) of Examples 1 to 11 are shown in Table 5. "-" means that measurement was not conducted.

TABLE 3

| | | | Polyimide film | | | | | | | | |
|---|---|---|---|---|---|---|---|---|---|---|---|
| | | | | Thermal properties | | Optical properties | | | | Mechanical properties | | |
| | Raw material | Treatment condition | Film thickness (μm) | Tg (°C.) | CTE (ppm/K) | Total light transmittance (%) | Haze (%) | b* value (−) | Light transmittance at 450 nm (%) The parenthesized values are those calculated for a thickness of 10 μm | MIT folding endurance (folds) | Tensile strength (MPa) | Tensile elongation (%) |
| Example 1 | Synthesis Example 1 | Untreated | 15 | 261 | 43 | 90 | 0.2 | 0.0 | 85(90) | More than 1000000 | 121 | 30 |
| | | After autoclave sterilization | 15 | 257 | 47 | 90 | 0.3 | 0.1 | 86(91) | More than 1000000 | 126 | 37 |
| | | After dry heat sterilization | 15 | 258 | 45 | 90 | 0.3 | 0.1 | 86(91) | More than 1000000 | 132 | 35 |
| Example 2 | Synthesis Example 2 | Untreated | 26 | 290 | 50 | 90 | 0.6 | 1.0 | 88(92) | 3000 | 96 | 8 |
| | | After autoclave sterilization | 26 | 293 | 47 | 90 | 0.63 | 1.2 | 87(91) | 1300 | 93 | 6 |
| | | After dry heat sterilization | 27 | 291 | 48 | 90 | 0.43 | 1.4 | 86(91) | 1500 | 92 | 6 |
| Example 3 | Synthesis Example 3 | Untreated | 19 | 286 | 15 | 87 | 0.7 | 2.1 | 82(89) | 39000 | 261 | 12 |
| | | After autoclave sterilization | 18 | 291 | 15 | 88 | 0.6 | 2.2 | 83(89) | 36000 | 273 | 14 |
| | | After dry heat sterilization | 18 | 284 | 14 | 87 | 0.6 | 2.2 | 82(89) | 45000 | 270 | 11 |
| Example 4 | Synthesis Example 4 | Untreated | 21 | 270 | 50 | 90 | 0.4 | 0.7 | 87(93) | More than 1000000 | 115 | 17 |
| | | After autoclave sterilization | 20 | 266 | 50 | 90 | 0.5 | 0.8 | 88(93) | More than 1000000 | 120 | 26 |
| | | After dry heat sterilization | 20 | 267 | 51 | 90 | 0.5 | 0.8 | 88(93) | More than 1000000 | 120 | 20 |
| Example 5 | Synthesis Example 5 | Untreated | 20 | 280 | 8 | 87 | 0.9 | 1.9 | 83(87) | 490000 | 293 | 8 |
| | | After autoclave sterilization | 19 | 283 | 8 | 87 | 0.8 | 2.0 | 82(88) | 420000 | 283 | 8 |
| | | After dry heat sterilization | 21 | 285 | 9 | 87 | 0.7 | 1.8 | 83(89) | 670000 | 298 | 10 |
| Example 6 | Synthesis Example 6 | Untreated | 22 | 219 | 51 | 89 | 0.8 | 1.9 | 82(87) | 1500 | 129 | 10 |
| | | After autoclave sterilization | 21 | 219 | 51 | 90 | 0.8 | 2.0 | 86(89) | 1800 | 129 | 9 |
| | | After dry heat sterilization | 22 | 218 | 53 | 90 | 0.6 | 2.0 | 86(88) | 1200 | 124 | 8 |
| Example 7 | Synthesis Example 7 | Untreated | 19 | 205 | 51 | 90 | 0.9 | 1.9 | 87(92) | 104000 | 118 | 11 |
| | | After autoclave sterilization | 19 | 205 | 54 | 90 | 0.7 | 1.8 | 88(92) | 174000 | 116 | 10 |
| | | After dry heat sterilization | 20 | 199 | 56 | 90 | 0.7 | 1.8 | 87(91) | 132000 | 113 | 10 |

TABLE 4

| | | | Polyimide film | | | | | | | | |
|---|---|---|---|---|---|---|---|---|---|---|---|
| | | | | Optical properties | | | | | Mechanical properties | | |
| | Raw material | Treatment condition | Film thickness (μm) | Thermal properties | | Total light transmittance (%) | Haze (%) | b* value (−) | Light transmittance at 450 nm (%) The parenthesized values are those calculated for a thickness of 10 μm | MIT folding endurance (folds) | Tensile strength (MPa) | Tensile elongation (%) |
| | | | | Tg (° C.) | CTE (ppm/K) | | | | | | | |
| Example 8 | Synthesis Example 9 | Untreated | 21 | 194 | 56 | 90 | 0.6 | 0.9 | 88(92) | 709000 | 113 | 26 |
| | | After autoclave sterilization | 20 | 194 | 60 | 90 | 1.1 | 0.7 | 87(91) | More than 1000000 | 113 | 30 |
| | | After dry heat sterilization | 19 | 195 | 62 | 90 | 1.0 | 0.7 | 87(91) | More than 1000000 | 114 | 37 |
| Example 9 | Synthesis Example 10 | Untreated | 16 | 292 | 42 | 89 | 0.6 | 0.1 | 85(90) | 22000 | 124 | 8 |
| | | After autoclave sterilization | 16 | 292 | 42 | 89 | 0.7 | 0.2 | 86(90) | 33000 | 129 | 9 |
| | | After dry heat sterilization | 16 | 293 | 42 | 89 | 0.8 | 0.4 | 85(89) | 26000 | 125 | 8 |
| Example 10 | Synthesis Example 11 | Untreated | 17 | 233 | 59 | 89 | 0.8 | 1.3 | 85(89) | 9400 | 119 | 13 |
| | | After autoclave sterilization | 17 | 231 | 60 | 89 | 0.8 | 1.3 | 85(89) | 1400 | 121 | 12 |
| | | After dry heat sterilization | 17 | 228 | 62 | 88 | 1.1 | 1.8 | 83(88) | 8300 | 113 | 11 |
| Example 11 | Synthesis Example 12 | Untreated | 29 | 210 | 46 | 88 | 0.9 | 2.6 | 84(88) | 37000 | 88 | 26 |
| | | After autoclave sterilization | 30 | 208 | 47 | 88 | 1.0 | 2.3 | 82(88) | 41000 | 92 | 31 |
| | | After dry heat sterilization | 30 | 205 | 47 | 88 | 1.2 | 2.9 | 81(86) | 33000 | 90 | 24 |

TABLE 5

Polyimide film
Chemical properties (solvent resistance)

| | Acetone | Methanol | Ethanol | Cresol | DMSO | NMP | DMAc | Chloroform |
|---|---|---|---|---|---|---|---|---|
| Example 1 | 5 | 5 | 5 | 5 | 5 | 5 | 5 | 5 |
| Example 2 | 3 | 5 | 5 | 5 | 5 | 5 | 5 | 5 |
| Example 3 | 5 | 5 | 5 | 5 | 5 | 5 | 5 | 5 |
| Example 4 | 5 | 5 | 5 | 5 | 5 | 5 | 5 | 5 |
| Example 5 | 5 | 5 | 5 | 5 | 5 | 5 | 5 | 5 |
| Example 6 | 5 | 5 | 5 | 5 | 5 | 5 | 5 | 5 |
| Example 7 | 5 | 5 | 5 | 5 | 5 | 5 | 5 | 5 |
| Example 8 | 5 | 5 | 5 | 5 | 5 | 5 | 5 | 5 |
| Example 9 | 4 | 5 | 5 | 3 | 5 | 5 | 5 | 4 |
| Example 10 | 4 | 5 | 5 | 2 | 3 | 3 | 3 | 4 |
| Example 11 | 4 | 5 | 5 | — | 3 | — | 3 | 4 |

It is seen from Tables 3 and 4 that all of the films of Examples 1 to 11, despite that each films had a thickness of more than 10 μm, had a total light transmittance as high as 87% or more, a haze as low as less than 1% before treatment, a b* value as low as 2.9 or less, and a light transmittance as high as 81% or more at a wavelength of 450 nm. From these facts, it is obvious that the total light transmittance and the light transmittance at a wavelength of 450 nm, as calculated for a thickness of 10 μm, would be similar to or higher than the actually measured values, and that the haze and the b* value, as calculated for a thickness of 10 μm, are similar to or lower than the actually measured values. For example, the larger the thickness of a film is, the higher the b* value of the film is. It is therefore obvious that when the films of Examples 1 to 7 had a b* value equal to or lower than a certain level, the b* value of the films as calculated for a thickness of 10 μm would be equal to or lower than 2.9.

It is seen that the film of Example 7, which contained a high proportion of alicyclic diamine-derived structural unit, had a higher glass transition temperature than the film of Example 8. The fact that the film of Example 8 had a lower b* value than the film of Example 7 despite having a lower content of alicyclic diamine-derived structural unit can be attributed to a lower oxygen concentration during curing.

Comparison of Examples 1, 3, and 5 reveals that the polyimides containing alicyclic diamines are ranked as follows in order of decreasing total light transmittance, increasing b* value, and decreasing colorless transparency: the polyimide containing H-XDA, the polyimide containing CHDA, and the polyimide containing NBDA.

It is seen from Table 5 that the films of Examples 1 to 11 had high solvent resistance, particularly to methanol and ethanol. It is seen that, among the films of Examples 1 to 11, the films of Examples 1 to 7 containing a polyimide in which the alicyclic diamine-derived unit was a group derived from an alicyclic diamine selected from the group consisting of 1,4-bis(aminomethyl)cyclohexane, trans-1,4-cyclohexyldiamine, and norbornanediamine and in which the aromatic tetracarboxylic dianhydride-derived group was a group derived from an aromatic tetracarboxylic dianhydride selected from the group consisting of pyromellitic dianhydride, 3,3',4,4'-biphenyltetracarboxylic dianhydride, and bis (3,4-dicarboxyphenyl) ether dianhydride, had higher solvent resistance than the films of Examples 9 to 11 containing other polyimides.

4. Manufacturing of Medical Instrument

Example 12: Bag-Shaped Article Produced with Multi-Layer Film (Example of Embodiment 1)

A polyamide acid solution (varnish) as prepared in Synthesis Example 6 was applied to polyimide film 4 (high-Tg layer, thickness: 21 μm, Tg: 270° C.) as produced above, and the film with the solution was then placed in an inert oven, in which the temperature was elevated from 50° C. to 280° C. under a nitrogen stream and maintained at 280° C. for 1 hour. Thus, a polyimide layer (low-Tg layer, thickness: 10 μm, Tg: 219° C.) was formed to obtain a multi-layer film (thickness: 31 μm).

The obtained multi-layer film was cut to prepare two 10-cm-square pieces. The polyimide resin layers of the two multi-layer films were bonded to each other, and then the two multi-layer films were heat-laminated by a manual hot press machine at 250° C. and 10 MPa for 1 hour to obtain a multi-layer body.

The 180° peel strength (delamination resistance) of the obtained multi-layer body (thickness: 60 μm) was measured using a tester identical to that used for the above tensile test with a different jig at a speed of 10 mm/min. The measured strength was 1.5 kN/m.

The multi-layer body was subjected to sterilization in an autoclave (under steam) at 121° C. for 20 minutes. The appearance of the sterilized multi-layer body was visually inspected. The multi-layer body had no defects such as change in appearance, deformation, and degeneration after the sterilization.

This demonstrated that a multi-layer film having high delamination resistance can be produced through heat lamination. Thus, a bag-shaped receptacle having a hollow interior can be made by applying a polyimide layer only along the edge portion of a sheet and performing heat lamination in the same manner as above. The multi-layer film is therefore expected to be used for medical applications.

Example 13: Image Fiber Coated with Coating Layer (Example of Embodiment 2)

Quartz-based image fiber having a diameter of 500 μm and a length of 3.5 cm and intended for use in image transmission was subjected to dip coating in which the fiber was immersed in a varnish (polyamide acid solution) as obtained in Synthesis Example 4 and then withdrawn from the solution at a speed of 3 cm/min.

Subsequently, the dip-coated fiber was placed in an oven, in which the temperature was elevated from 50° C. to 280° C. under a nitrogen stream over 1.5 hours and maintained at 280° C. for 1 hour to accomplish solvent removal and thermal imidization. As a result, image fiber coated with a 12-μm-thick coating layer made of a cured product of the polyamide acid solution was obtained.

The obtained image fiber was subjected to sterilization in an autoclave (under steam) at 121° C. for 20 minutes. The appearance of the sterilized image fiber was visually inspected. The image fiber had no defects such as change in appearance, deformation, and degeneration after the sterilization.

The present application claims priority based on Japanese Patent Application No. 2016-144842 filed on Jul. 22, 2016. The entire contents of the specification and drawings of the Japanese Patent Application are incorporated herein.

INDUSTRIAL APPLICABILITY

The present invention can provide a medical film superior in transparency, heat resistance, and solvent resistance.

REFERENCE SIGNS LIST

10 Medical film
11A High-Tg layer
11B Low-Tg layer

The invention claimed is:
1. A medical film comprising
   a multi-layer film comprising a layer containing a first polyimide having a relatively high glass transition temperature and a layer containing a second polyimide having a relatively low glass transition temperature,
   wherein at least one of the first polyimide and the second polyimide has a glass transition temperature of 190° C. or higher as measured by thermal mechanical analysis (TMA), and
   wherein the medical film has a total light transmittance of 80% or more and a b* value in L*a*b* color system of 10 or less when having a thickness of 10 μm.
2. The medical film according to claim 1, wherein the medical film has a b* value in L*a*b* color system of 5 or less when having a thickness of 10 μm.
3. The medical film according to claim 1, wherein the at least one of the first polyimide and the second polyimide comprises an imide unit represented by the following formula (1):

[Formula 1]

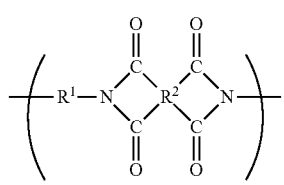

(1)

wherein

R¹ is an alicyclic diamine-derived group, and

R² is an aromatic tetracarboxylic dianhydride-derived group.

4. The medical film according to claim 3, wherein:

the alicyclic diamine-derived group is a group derived from an alicyclic diamine selected from the group consisting of 1,4-bis(aminomethyl)cyclohexane, trans-1,4-cyclohexyldiamine, and norbornanediamine; and the aromatic tetracarboxylic dianhydride-derived group is a group derived from an aromatic tetracarboxylic dianhydride selected from the group consisting of pyromellitic dianhydride, 3,3',4,4'-biphenyltetracarboxylic dianhydride, and bis(3,4-dicarboxyphenyl) ether dianhydride.

5. The medical film according to claim 1, wherein the medical film has a thickness of 1 to 100 μm.

6. A medical instrument comprising a medical film according to claim 1.

7. A method of manufacturing a medical instrument, comprising:

folding a medical film or stacking at least two medical films to obtain a multi-layer body; and subjecting at least a part of the multi-layer body to thermal compression bonding to obtain a medical instrument in the form of a bag-shaped article, wherein the medical film comprises a heat resistant resin having a glass transition temperature of 190° C. or higher as measured by thermal mechanical analysis (TMA) and the medical film has a total light transmittance of 80% or more and a b* value in L*a*b* color system of 10 or less when having a thickness of 10 μm.

* * * * *